US012775434B2

(12) United States Patent
Chen et al.

(10) Patent No.: US 12,775,434 B2
(45) Date of Patent: Oct. 27, 2026

(54) SCREEN SHARING METHOD AND RELATED DEVICE

(71) Applicant: Huawei Technologies Co., Ltd., Shenzhen (CN)

(72) Inventors: Guangjun Chen, Wuhan (CN); Bo Wang, Wuhan (CN); Bo Xu, Shanghai (CN); Zhi She, Wuhan (CN); Zhangliang Xiong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/573,266

(22) PCT Filed: Jun. 20, 2022

(86) PCT No.: PCT/CN2022/099724

§ 371 (c)(1),
(2) Date: Dec. 21, 2023

(87) PCT Pub. No.: WO2022/268009

PCT Pub. Date: Dec. 29, 2022

(65) Prior Publication Data

US 2024/0370218 A1 Nov. 7, 2024

(30) Foreign Application Priority Data

Jun. 23, 2021 (CN) ......................... 202110700920.4

(51) Int. Cl.
*G06F 3/14* (2006.01)

(52) U.S. Cl.
CPC .................................. *G06F 3/1454* (2013.01)

(58) Field of Classification Search
CPC .. G06F 3/1454; G06F 3/0482; G06F 3/04886; G06F 9/542; G06F 3/1438;
(Continued)

(56) References Cited

U.S. PATENT DOCUMENTS

2006/0136828 A1* 6/2006 Asano .................. G06F 3/1454 715/764
2014/0298355 A1* 10/2014 Kim ...................... G06F 3/1454 719/313
(Continued)

FOREIGN PATENT DOCUMENTS

CN 102883135 B 8/2015
CN 106341382 A 1/2017
(Continued)

*Primary Examiner* — Amr A Awad
*Assistant Examiner* — Aaron Midkiff
(74) *Attorney, Agent, or Firm* — Slater Matsil, LLP

(57) ABSTRACT

Embodiments of this application provide a screen sharing method and a related device. The method may be applied to a first system. The first system includes a first device, a second device, and a third device. The first device communicates with the second device through a first connection, and the first device communicates with the third device through a second connection. The first connection is different from the second connection. The method includes: The first device receives a first operation, where the first operation is used to trigger sharing of a first interface. The second device displays the first interface, and the third device displays the first interface. The first device displays a second interface, where the first interface is different from the second interface.

20 Claims, 22 Drawing Sheets

(58) Field of Classification Search
CPC ......... G06F 3/048–04897; G06F 9/451; G06F 9/452; G06F 16/4393; G06F 2009/45575; G06F 1/1454; G06F 16/00–986; G06F 3/1462; G06F 9/54–548; G06F 9/44–548; G06F 2203/048–04809; H04N 21/4318; H04N 21/6405; H04L 65/403–4046; H04L 51/224; H04L 65/4015; H04L 65/611; G09G 2370/12; G09G 2354/00; H04M 1/72403; H04M 2250/16
See application file for complete search history.

(56) References Cited

U.S. PATENT DOCUMENTS

| | | | | |
|---|---|---|---|---|
| 2015/0120817 | A1* | 4/2015 | Jeong | G06F 3/1423 709/203 |
| 2016/0360339 | A1 | 12/2016 | Yuan et al. | |
| 2019/0250759 | A1* | 8/2019 | Chung | G06F 3/0488 |
| 2021/0042132 | A1 | 2/2021 | Park et al. | |
| 2022/0286496 | A1* | 9/2022 | Qi | G06F 9/451 |

FOREIGN PATENT DOCUMENTS

| | | | |
|---|---|---|---|
| CN | 111049979 | A | 4/2020 |
| CN | 111935150 | A | 11/2020 |
| CN | 112312060 | A | 2/2021 |

* cited by examiner (A)

(B)

CONT. FROM FIG. 5(A)

TO FIG. 5(B)-2

CONT.
FROM

CONT. FROM FIG. 9A

SCREEN SHARING METHOD AND RELATED DEVICE

CROSS-REFERENCE TO RELATED APPLICATIONS

This application is a national stage of International Application No. PCT/CN2022/099724, filed on Jun. 20, 2022, which claims priority to Chinese Patent Application No. 202110700920.4, filed on Jun. 23, 2021. Both of the aforementioned applications are hereby incorporated by reference in their entireties.

TECHNICAL FIELD

This application relates to the field of computer technologies, and in particular, to a screen sharing method and a related device.

BACKGROUND

Currently, a screen sharing function is usually used in multi-party interaction scenarios such as a conference, teaching, and presentation. For example, a plurality of users may join a same conference by using respective electronic devices, and any one of the users may share a device screen with the other devices in the current conference, but a device that does not join the conference cannot share a screen with the device that has joined the conference, and cannot obtain the screen shared by the device that has joined the conference. Screen sharing has a high requirement and a small sharing scope. This limits an application scenario of the screen sharing.

SUMMARY

Embodiments of this application disclose a screen sharing method and a related device, so that content and a scope of screen sharing are extended and an application scenario is wider.

According to a first aspect, an embodiment of this application provides a screen sharing method, applied to a first system. The first system includes a first device, a second device, and a third device. The first device communicates with the second device through a first connection, and the first device communicates with the third device through a second connection. The first connection is different from the second connection. The method includes: The first device receives a first operation, where the first operation is used to trigger sharing of a first interface. The second device displays the first interface, and the third device displays the first interface. The first device displays a second interface, where the first interface is different from the second interface.

In this application, the second device that establishes the first connection to the first device and the third device that establishes the second connection to the second device may perform screen sharing by using the first device. The second device and the third device may need no connection, and the first connection may be different from the second connection. Therefore, content and a scope of screen sharing are greatly extended. In addition, when the second device and the third device perform screen sharing, the first device may display an interface other than the shared first interface without affecting normal use of the first device by a user. Therefore, use by the user is more convenient, and an application scenario of screen sharing is wider.

In a possible implementation, before the first device receives the first operation, the method further includes: The first device receives a second operation; and the first device displays at least one screen sharing option in response to the second operation, where the at least one screen sharing option indicates a shareable user interface on the first device and/or a shareable user interface on the third device, and one of the at least one screen sharing option indicates one shareable user interface. That the first device receives a first operation includes: The first device receives the first operation performed on a first option, where the first option is an option that is in the at least one screen sharing option and that indicates the first interface.

In this application, the user may select a shared interface, which not only includes a shareable user interface on the first device that receives the first operation, but also includes a shareable user interface on the third device that establishes the second connection to the first device. Therefore, content and a scope of screen sharing are extended, and selection for the user is more flexible.

In a possible implementation, that the first device displays at least one screen sharing option in response to the second operation includes: The first device sends first request information to the third device in response to the second operation, where the first request information requests to obtain task information of the third device, and the task information is information about the shareable user interface on the third device; and the first device displays, based on the first task information sent by the third device, the screen sharing option indicating the shareable user interface on the third device.

In a possible implementation, the first option indicates the first interface that is shareable on the third device; and the method further includes: The first device sends first indication information to the third device in response to the first operation, where the first indication information indicates the first interface; and the third device sends media data of the first interface to the first device based on the first indication information when displaying a third interface. That the third device displays the first interface includes: The third device switches a display interface from the third interface to the first interface in response to second indication information sent by the first device or a received third operation.

In this application, when the shared first interface is a shareable interface on the third device, the third device may not display the shared first interface, and the user can normally operate the third device without affecting screen sharing. Therefore, use by the user is more convenient and flexible.

In a possible implementation, the first option indicates the first interface that is shareable on the third device. The method further includes: The first device displays the first interface in response to the first operation. That the first device displays the second interface includes: The first device switches a display interface from the first interface to the second interface in response to a received fourth operation.

In this application, when the shared first interface is a shareable interface on the third device, the first device may display the shared first interface, or may display another interface in response to a user operation. The user can normally operate the first device without affecting screen sharing. Therefore, use by the user is more convenient and flexible.

In a possible implementation, the first option indicates the first interface that is shareable on the third device. That the first device displays the second interface includes: The first device simultaneously displays the first interface and the second interface in a split-screen manner or a floating window manner.

In this application, when the shared first interface is a shareable interface on the third device, the first device may not only display the shared first interface, but also display the another interface. The user who uses the first device may view content of screen sharing, and further perform another operation. Therefore, use by the user is more convenient and flexible.

In a possible implementation, the method further includes: The first device receives a fifth operation when displaying the first interface; the first device sends information about the fifth operation to the third device; the third device updates the first interface to a fourth interface based on the information about the fifth operation; the third device sends media data of the fourth interface to the first device; the first device displays the fourth interface based on the media data of the fourth interface and sends the media data of the fourth interface to the second device; and the second device displays the fourth interface based on the media data of the fourth interface.

In this application, when the shared first interface is a shareable interface on the third device, the user may not only interact with the first interface by using the third device, but also interact with the first interface by using the first device when the first device displays the first interface. This greatly facilitates use by the user.

In a possible implementation, the first option indicates the first interface that is shareable on the third device. The method further includes: The first device sends third indication information to the third device in response to the first operation, where the third indication information indicates the first interface; the third device sends media data of the first interface to the first device based on the third indication information; and the first device sends the media data of the first interface to the second device. That the third device displays the first interface includes: The third device displays the first interface based on the third indication information. That the second device displays the first interface includes: The second device displays the first interface based on the media data that is of the first interface and that is sent by the first device.

In a possible implementation, the first option indicates the first interface that is shareable on the first device. The method further includes: The first device sends media data of the first interface to the second device in response to the first operation. That the second device displays the first interface includes: The second device displays the first interface based on the media data of the first interface sent by the first device. The method further includes: The first device sends the media data of the first interface to the third device in response to the first operation. That the third device displays the first interface includes: The third device displays the first interface based on the media data that is of the first interface and that is sent by the first device.

In a possible implementation, the first option indicates the first interface that is shareable on the first device, and the first operation is used to trigger sharing of the first interface with the second device and the third device. Before the first device displays the second interface, the method further includes: The first device displays the first interface; the first device switches a display interface from the first interface to the second interface in response to a received sixth operation; and the first device displays first prompt information in response to the received sixth operation, where the first prompt information prompts a user whether to switch a display interface of the third device to the second interface.

In this application, when the shared first interface is a shareable interface on the first device, and the first device switches the display interface from the shared first interface to another interface, the first device may prompt the user whether to synchronously switch the display interface of the third device. The user can select a screen sharing manner based on a requirement, so that use by the user is more convenient and flexible.

In some embodiments, the first device may only switch the display interface from the first interface to the second interface in response to the sixth operation, and does not display the first prompt information.

In a possible implementation, the first option indicates the first interface that is shareable on the first device, and the first operation is used to trigger sharing of the first interface with the second device. After the second device displays the first interface, the method further includes: The first device displays second prompt information in response to a received seventh operation, where the second prompt information prompts a user whether to share the first interface with the third device; and the first device sends media data of the first interface to the third device in response to a received eighth operation. That the third device displays the first interface includes: The third device displays the first interface based on the media data that is of the first interface and that is sent by the first device.

In this application, when the shared first interface is a shareable interface on the first device, the first device may first share the first interface with the second device, and then select, based on a user operation, whether to provide the first interface for the third device. The user may select a target device for screen sharing based on a requirement. In this way, a screen sharing manner is diversified, so that use by the user is more flexible and convenient.

In a possible implementation, the first option indicates the first interface that is shareable on the first device. The method further includes: The third device receives a ninth operation when displaying the first interface; the third device sends information about the ninth operation to the first device; the first device updates the first interface to a fifth interface based on the information about the ninth operation; the first device sends media data of the fifth interface to the second device and the third device; and the second device displays the fifth interface based on the media data of the fifth interface, and the third device displays the fifth interface based on the media data of the fifth interface.

In this application, when the shared first interface is a shareable interface on the first device, the user may not only interact with the first interface by using the first device, but also interact with the first interface by using the third device when the third device displays the first interface. This greatly facilitates use by the user.

In a possible implementation, the first device and the second device are devices that are in a same conference, and the third device is a device whose distance from the first device is less than or equal to a preset distance.

According to a second aspect, an embodiment of this application provides another screen sharing method, applied to a first device. The first device communicates with a second device through a first connection, and the first device communicates with a third device through a second connection. The first connection is different from the second connection. The method includes: receiving a first operation; obtaining, in response to the first operation, media data of a first interface that is shareable on the third device; sending the media data of the first interface to the second device, where the media data of the first interface is used by the second device to display the first interface; and displaying a second interface, where the first interface is different from the second interface.

In this application, the first device may share a user interface on the third device that establishes the second connection to the first device with the second device that establishes the first connection to the first device. The second device and the third device may need no connection, and the first connection may be different from the second connection. This greatly extends content and a scope of screen sharing. In addition, when the second device and the third device perform screen sharing, the first device may display an interface other than the shared first interface without affecting normal use of the first device by a user. Therefore, use by the user is more convenient, and an application scenario of screen sharing is wider.

In a possible implementation, before the receiving a first operation, the method further includes: receiving a second operation; and displaying at least one screen sharing option in response to the second operation, where the at least one screen sharing option indicates a shareable user interface on the third device, and one of the at least one screen sharing option indicates one shareable user interface; and the receiving a first operation includes: receiving the first operation performed on a first option, where the first option is an option that is in the at least one screen sharing option and that indicates the first interface.

In a possible implementation, the obtaining, in response to the first operation, media data of a first interface that is shareable on the third device includes: sending first indication information to the third device in response to the first operation, where the first indication information indicates the first interface; and receiving the media data of the first interface that is sent by the third device based on the first indication information, where the media data of the first interface is sent when the third device displays a third interface; and the method further includes: sending second indication information to the third device, where the second indication information indicates the third device to switch a display interface from the third interface to the first interface.

In this application, when the shared first interface is a shareable interface on the third device, the third device may not display the shared first interface, and the user can normally operate the third device without affecting screen sharing. Therefore, use by the user is more convenient and flexible.

In a possible implementation, the method further includes: displaying the first interface in response to the first operation; and the displaying a second interface includes: switching a display interface from the first interface to the second interface in response to a received fourth operation.

In this application, when the shared first interface is a shareable interface on the third device, the first device may display the shared first interface, or may display another interface in response to a user operation. The user can normally operate the first device without affecting screen sharing. Therefore, use by the user is more convenient and flexible.

In a possible implementation, the displaying a second interface includes: simultaneously displaying the first interface and the second interface in a split-screen manner or a floating window manner.

In this application, when the shared first interface is a shareable interface on the third device, the first device may not only display the shared first interface, but also display the another interface. The user who uses the first device may view content of screen sharing, and further perform another operation. Therefore, use by the user is more convenient and flexible.

In a possible implementation, the method further includes: receiving a fifth operation when the first interface is displayed; sending information about the fifth operation to the third device; receiving media data that is of a fourth interface and that is sent by the third device, where the fourth interface is obtained by the third device by updating the first interface based on the information about the fifth operation; and displaying the fourth interface based on the media data of the fourth interface, and sending the media data of the fourth interface to the second device, where the media data of the fourth interface is used by the second device to display the fourth interface.

In this application, when the shared first interface is a shareable interface on the third device, the user may not only interact with the first interface by using the third device, but also interact with the first interface by using the first device when the first device displays the first interface. This greatly facilitates use by the user.

According to a third aspect, an embodiment of this application provides another screen sharing method, applied to a first device. The first device communicates with a second device through a first connection, and the first device communicates with a third device through a second connection. The first connection is different from the second connection. The method includes: receiving a first operation; in response to the first operation, sending media data of a first interface that is shareable on the first device to the second device, where the media data of the first interface is used by the second device to display the first interface; sending the media data of the first interface to the third device, where the media data of the first interface is used by the third device to display the first interface; and displaying a second interface, where the first interface is different from the second interface.

In this application, the first device may share the first interface with the second device that has established the first connection, or may share the first interface with the third device that has established the second connection. The second device and the third device may need no connection, and the first connection may be different from the second connection. This greatly extends content and a scope of screen sharing. In addition, the first device may display an interface other than the shared first interface without affecting normal use of the first device by a user. Therefore, use by the user is more convenient, and an application scenario of screen sharing is wider.

In a possible implementation, before the receiving a first operation, the method further includes: receiving a second operation; and displaying at least one screen sharing option in response to the second operation, where the at least one screen sharing option indicates a shareable user interface on the first device, and one of the at least one screen sharing option indicates one shareable user interface; and the receiving a first operation includes: receiving the first operation performed on a first option, where the first option is an option that is in the at least one screen sharing option and that indicates the first interface.

In a possible implementation, before the displaying a second interface, the method further includes: displaying the first interface; switching a display interface from the first interface to the second interface in response to a received sixth operation; and displaying first prompt information in response to the received sixth operation, where the first prompt information prompts a user whether to switch a display interface of the third device to the second interface.

In this application, when the shared first interface is a shareable interface on the first device, and the first device switches the display interface from the shared first interface to another interface, the first device may prompt the user whether to synchronously switch the display interface of the third device. The user can select a screen sharing manner based on a requirement, so that use by the user is more convenient and flexible.

In some embodiments, the first device may only switch the display interface from the first interface to the second interface in response to the sixth operation, and does not display the first prompt information.

In a possible implementation, before the sending media data of the first interface to the third device, the method further includes: displaying second prompt information in response to a received seventh operation, where the second prompt information prompts a user whether to share the first interface with the third device; and the sending the media data of the first interface to the third device includes: sending the media data of the first interface to the third device in response to a received eighth operation.

In this application, when the shared first interface is a shareable interface on the first device, the first device may first share the first interface with the second device, and then select, based on a user operation, whether to provide the first interface for the third device. The user may select a target device for screen sharing based on a requirement. In this way, a screen sharing manner is diversified, so that use by the user is more flexible and convenient.

In a possible implementation, the method further includes: receiving information about a ninth operation that is sent by the third device, where the ninth operation is an operation received by the third device when the third device displays the first interface; updating the first interface to a fifth interface based on the information about the ninth operation; and sending media data of the fifth interface to the second device and the third device, where the media data of the fifth interface is used by the second device and the third device to display the fifth interface.

In this application, when the shared first interface is a shareable interface on the first device, the user may not only interact with the first interface by using the first device, but also interact with the first interface by using the third device when the third device displays the first interface. This greatly facilitates use by the user.

According to a fourth aspect, an embodiment of this application provides a first system, including a first device, a second device, and a third device. The first device communicates with the second device through a first connection, and the first device communicates with the third device through a second connection. The first connection is different from the second connection. The first device, the second device, and the third device are the first device, the second device, and the third device in the screen sharing method according to any one of the first aspect and the implementations of the first aspect of embodiments of this application.

According to a fifth aspect, an embodiment of this application provides an electronic device, including a transceiver, a processor, and a memory. The memory is configured to store a computer program, and the processor invokes the computer program to perform the screen sharing method according to any one of the second aspect to the third aspect and the implementations of the second aspect to the third aspect of embodiments of this application.

According to a sixth aspect, an embodiment of this application provides a computer storage medium. The computer storage medium stores a computer program. When the computer program is executed by a processor, the screen sharing method according to any one of the first aspect to the third aspect and the implementations of the first aspect to the third aspect of embodiments of this application is implemented.

According to a seventh aspect, an embodiment of this application provides a computer program product. When the computer program product runs on an electronic device, the electronic device is enabled to perform the screen sharing method according to any one of the first aspect to the third aspect and the implementations of the first aspect to the third aspect of embodiments of this application.

According to an eighth aspect, an embodiment of this application provides an electronic device. The electronic device includes the method or apparatus for performing any embodiment of this application. The electronic device is, for example, a chip.

BRIEF DESCRIPTION OF THE DRAWINGS

The following describes accompanying drawings used in embodiments of this application.

DETAILED DESCRIPTION OF ILLUSTRATIVE EMBODIMENTS

The following clearly describes the technical solutions according to embodiments of this application in detail with reference to the accompanying drawings. Terms used in implementations of embodiments of this application are merely used to explain specific embodiments of this application, and are not intended to limit this application.

An electronic device in embodiments of this application may be a terminal device such as a mobile phone, a tablet computer, a handheld computer, or a personal digital assistant (Personal Digital Assistant, PDA), a smart home device such as a smart television or a smart camera, a wearable device such as a smart band, a smart watch, or smart glasses, or another device such as a desktop, a laptop, a notebook computer, an ultra-mobile personal computer (Ultra-mobile Personal Computer, UMPC), a netbook, or a smart screen.

The following describes an example of an electronic device 100 according to an embodiment of this application.

Figure 1:
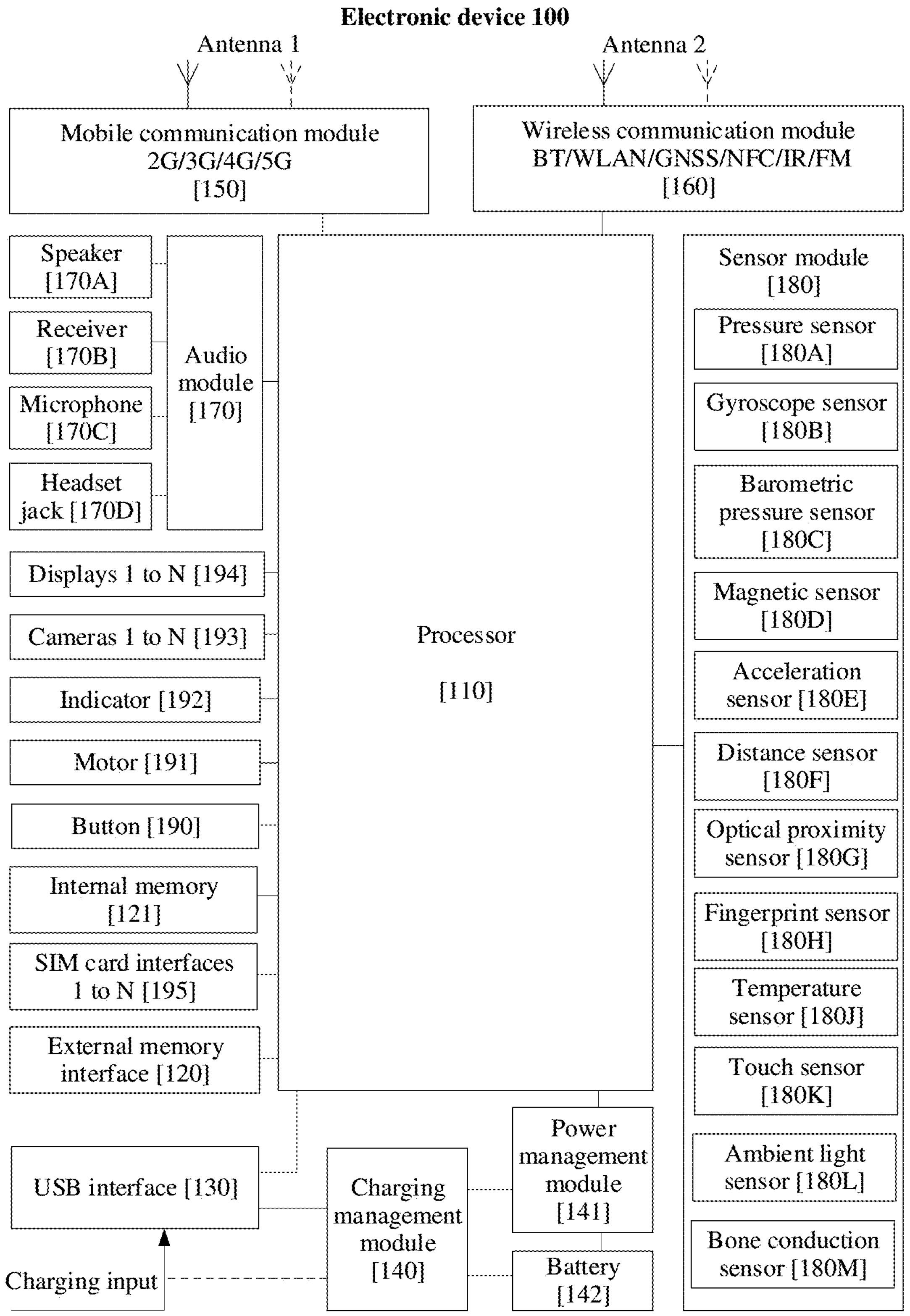
FIG. 1 is a schematic diagram of a hardware structure of an electronic device according to an embodiment of this application.

FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, or some components may be split, or different component arrangements may be used. The components shown in the figure may be implemented by hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a time sequence signal, to control instruction reading and instruction execution.

A memory may be further disposed in the processor 110, and is configured to store instructions and data. In some embodiments, the memory in the processor 110 is a cache. The memory may store an instruction or data just used or repeatedly used by the processor 110. If the processor 110 needs to use the instruction or the data again, the processor 110 may directly invoke the instruction or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The USB interface 130 is an interface that complies with the USB standard specification, and may be specifically a Mini USB interface, a Micro USB interface, a USB Type C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be configured to connect to another electronic device such as an AR device.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to receive a charging input from the charger. The charger may be a wireless charger or may be a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display 194, the camera 193, the wireless communication module 160, and the like. The power management module 141 may further be configured to monitor parameters such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert, through the antenna 1, the signal into an electromagnetic wave for radiation. In some embodiments, at least some function modules of the mobile communication module 150 may be disposed in the processor 110. In some embodiments, at least some function modules of the mobile communication module 150 may be disposed in a same device with at least some modules of the processor 110.

The modem processor may include a modulator and a demodulator. The modulator is configured to modulate a to-be-sent low-frequency baseband signal into a medium- and high-frequency signal. The demodulator is configured to demodulate the received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device with the mobile communication module 150 or another function module.

The wireless communication module 160 may provide a solution that is applied to the electronic device 100 and is for wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, through the antenna 2, the signal into an electromagnetic wave for radiation.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is an image processing microprocessor and connects the display 194 to the application processor. The GPU is configured to perform mathematical and geometric calculations, and is configured for image rendering. The processor 110 may include one or more GPUs, and the GPUs execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through a lens, and is projected to a photosensitive element. The photosensitive element may be a charge coupled device (charge coupled device, CCD) or a complementary metal-oxide-semiconductor (complementary metal-oxide-semiconductor, CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The internal memory 121 may include a program storage area and a data storage area. The program storage area may store an operating system, an application needed by at least one function (for example, a voice playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a hands-free call through the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed on an icon of an application "Messages", an instruction for viewing an SMS message is executed. When a touch operation whose touch operation intensity is greater than or equal to the first pressure threshold is performed on the icon of the application "Messages", an instruction for creating an SMS message is executed.

The gyroscope sensor 180B may be configured to determine a motion posture of the electronic device 100. In some embodiments, angular velocities of the electronic device 100 around three axes (which are x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip device, the electronic device 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect accelerations in all directions (usually on three axes) of the electronic device 100. When the electronic device 100 is still, a magnitude and a direction of gravity may be detected. The acceleration sensor 180E may further be configured to identify a posture of the electronic device, and is used in an application such as a pedometer or switching between landscape mode and portrait mode.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may further be used for automatically unlocking or locking a screen in leather case mode or pocket mode.

The ambient light sensor 180L is configured to sense ambient light brightness. The electronic device 100 may adaptively adjust brightness of the display 194 based on the sensed ambient light brightness. The ambient light sensor 180L may further be configured to automatically adjust a white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142, to avoid an abnormal shutdown of the electronic device 100 caused by a low temperature. In some other embodiments, when the temperature is less than still another threshold, the electronic device 100 boosts an output voltage of the battery 142, to avoid an abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effect. The motor 191 may further correspond to different vibration feedback effect for touch operations performed on different areas of the display 194. Different application scenarios (for example, a time reminder, information receiving, an alarm clock, and a game) may also correspond to different vibration feedback effect. Touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 is further compatible to an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. For example, a software system of a layered architecture may be an Android (Android) system, or may be a Huawei Mobile Services (Huawei mobile services, HMS) system. In embodiments of this application, an Android system with a layered architecture is used as an example to describe a software structure of a terminal.

Figure 2:
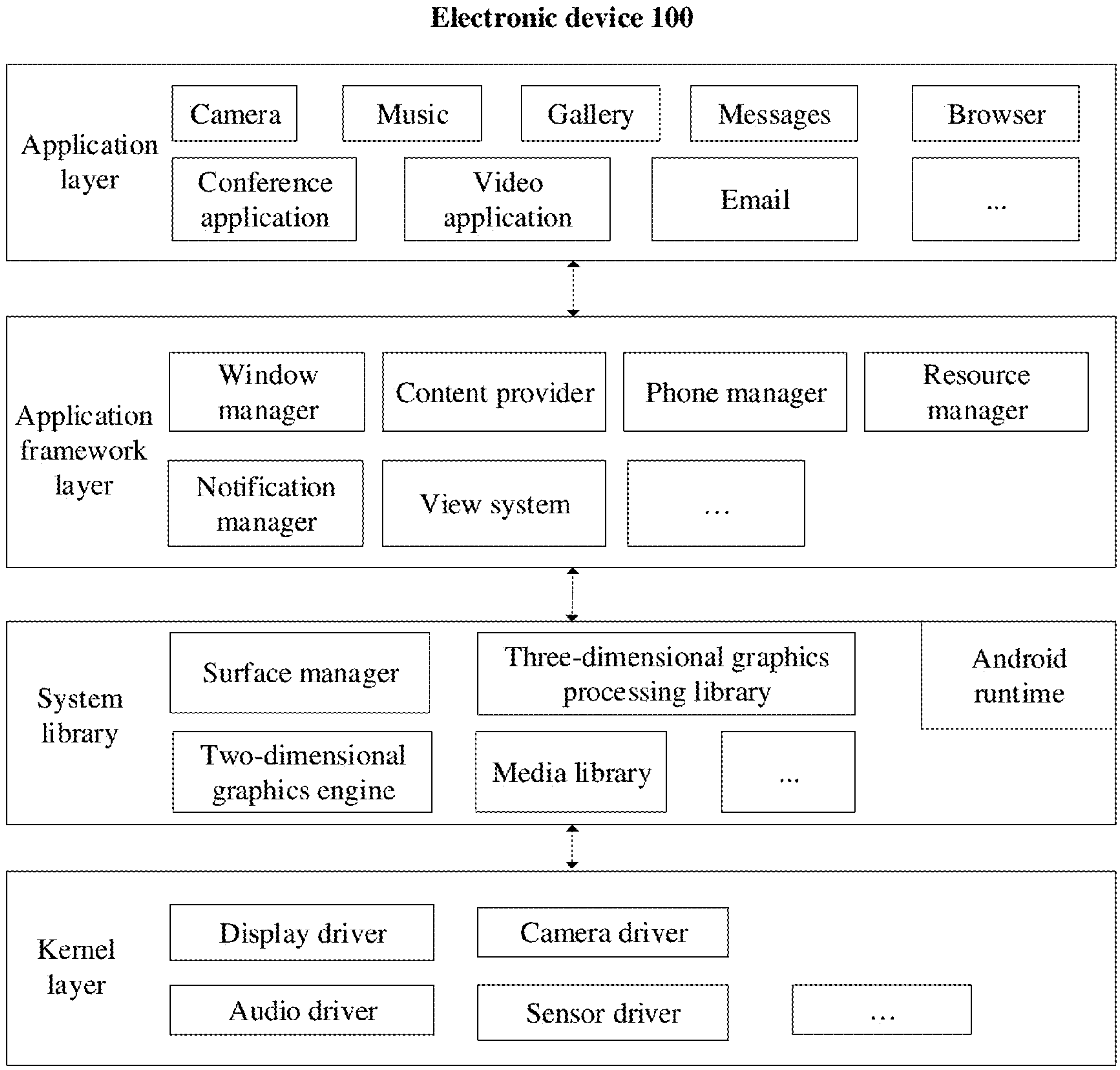
FIG. 2 is a schematic diagram of a software architecture of an electronic device according to an embodiment of this application.

FIG. 2 is a schematic diagram of a software structure of an electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Music, Gallery, Messages, Browser, a conference application, a video application, Email, and the like.

The application framework layer provides an application programming interface (application programming interface, API) and a programming framework for the applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a browsing bookmark, a phone book, and the like.

The view system includes visual controls such as a control for displaying a text and a control for displaying an image. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering, declining, or the like).

The resource manager provides various resources for an application, for example, a localized character string, an icon, a picture, a layout file, and a video file.

The notification manager enables an application to display notification information in a status bar, and may be configured to convey a notification type message. The message may automatically disappear after a short pause without a user interaction. For example, the notification manager is configured to provide a notification of download completion, a message notification, and the like. The notification manager may further display a notification in a form of a graph or a scroll bar text in a top status bar of the system, for example, a notification of an application running in the background, or may display a notification in a form of a dialog window on a screen. For example, text information is displayed in the status bar, an announcement is given, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run in the virtual machine. The virtual machine executes Java files at the application layer and the application framework layer as binary files. The virtual machine is configured to implement functions such as object life cycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a screen sharing scenario.

Figure 4:
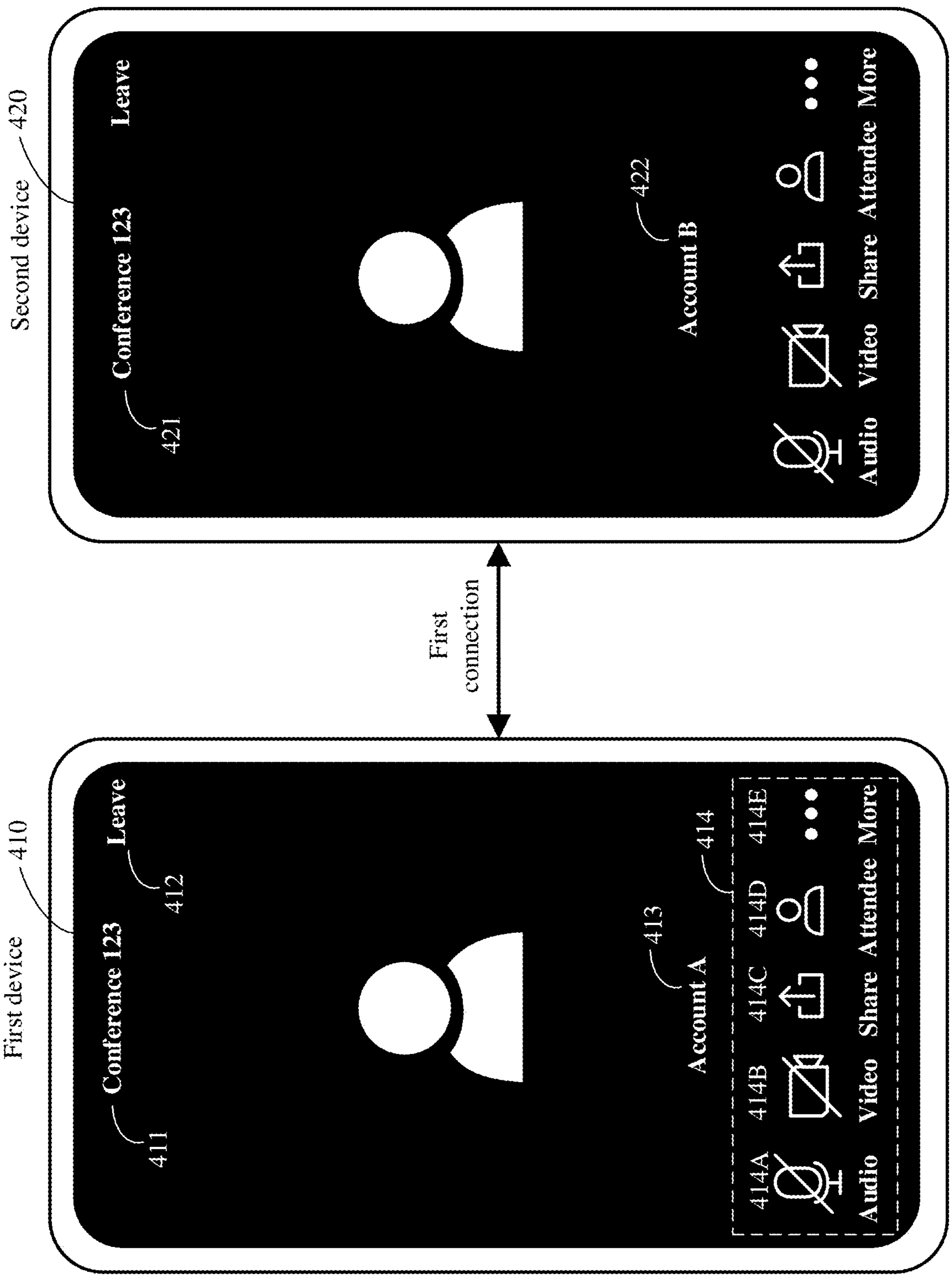
FIG. 4 to FIG. 14(B) are schematic diagrams of some user interface embodiments according to embodiments of this application.

It is assumed that the electronic device 100 has joined a conference A by using the conference application, and the display 194 displays a user interface of the conference A, for example, a user interface 410 shown in (A) in FIG. 4. When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. It is assumed that the touch operation is a touch tap operation, and a control corresponding to the tap operation is a control for screen sharing in the conference application, for example, a share option 414C in the user interface 410 shown in (A) in FIG. 4. The conference application may invoke an interface of the application framework layer, invoke a driver of the kernel layer, send, by using the mobile communication module 150 and/or the wireless communication module 160, media data (including, for example, image data displayed on the display 194 and audio data played by the speaker 170A) currently output by the electronic device 100 to another device that has joined the conference A, so that the another device outputs the foregoing media data.

The following describes a communication system in embodiments of this application by using an example.

Figure 3:
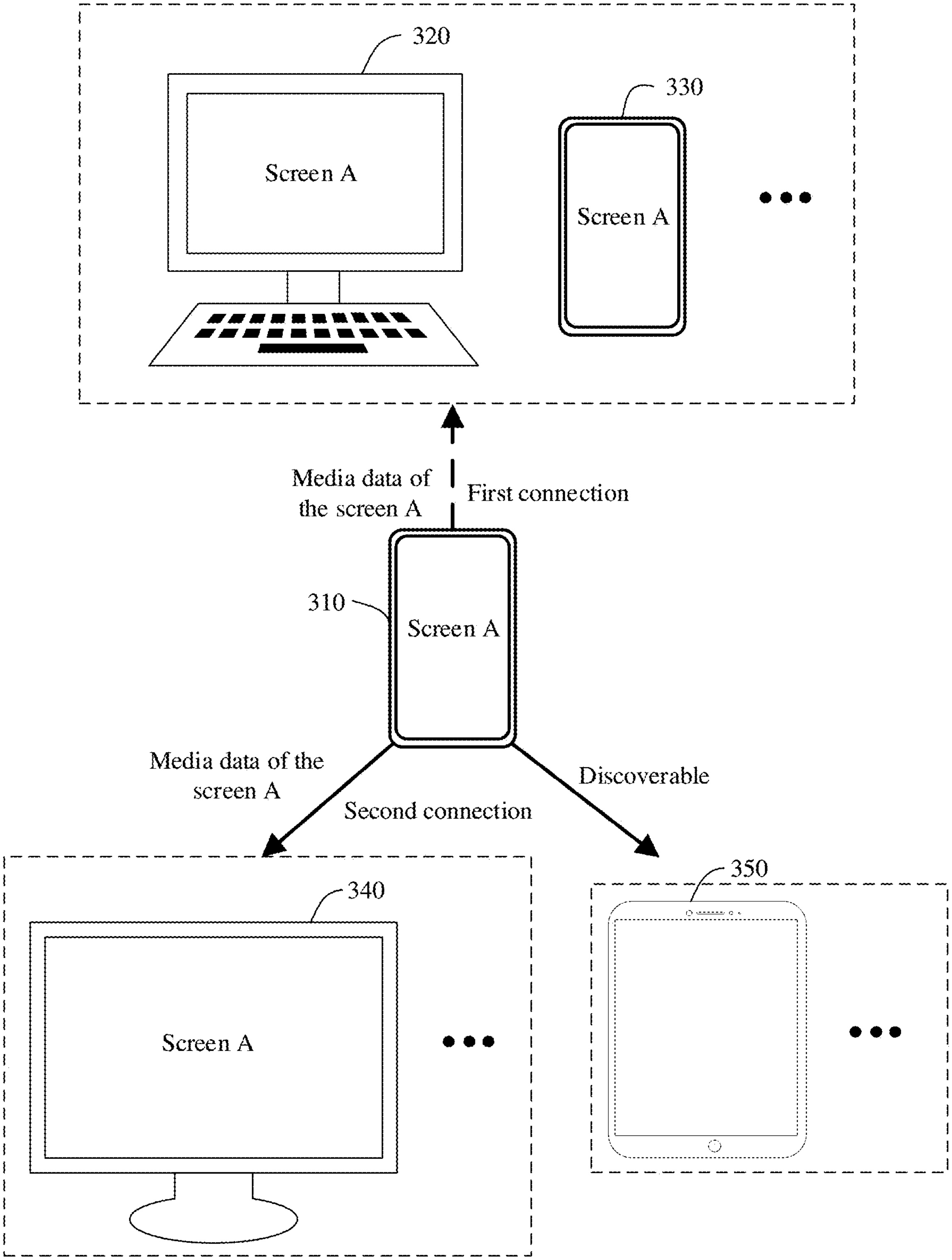
FIG. 3 is a schematic diagram of an architecture of a communication system according to an embodiment of this application.

FIG. 3 is an example of a schematic diagram of an architecture of a communication system.

As shown in FIG. 3, a device 310 may establish a first connection to a device such as a device 320 or a device 330. The first connection may be implemented in a wired manner, for example, a wired manner such as a high definition multimedia interface (high definition multimedia interface, HDMI), a universal serial bus (universal serial bus, USB), a coaxial cable, or an optical fiber. The first connection may alternatively be implemented in a wireless manner, for example, Bluetooth, wireless fidelity (wireless fidelity, Wi-Fi), a near field communication (near field communication, NFC) technology, or ultra wideband (ultra wideband, UWB). For example, a conference application may be separately installed on the device 310, the device 320, the device 330, and the like. When joining a same conference by using the conference application, the device 310 may send currently displayed media data of a screen A to the device such as the device 320 or the device 330 by using a server of the conference application, and the device such as the device 320 or the device 330 may also display the media data of the screen A. This may be understood as implementing of a screen sharing function.

As shown in FIG. 3, the device 310 may establish a second connection to a device such as a device 340. The second connection is different from the first connection. For an implementation, refer to the descriptions of the first connection. For example, the first connection is a wired connection implemented through an optical fiber or a coaxial cable, and the second connection is a wireless connection implemented through Bluetooth or Wi-Fi. For example, the device 310, the device 320, the device 330, and the like may be located in a same local area network, and the first connection is a wired connection implemented through an optical fiber or a coaxial cable or a wireless connection implemented through Wi-Fi. A distance between the device 310 and the device such as the device 340 may be less than or equal to a preset distance, and the second connection is a connection implemented by using a near field communication technology such as NFC or UWB.

For example, when the device 310 communicates with the device such as the device 320 or the device 330 by using the conference application, the device 310 may be connected to the device such as the device 340 through Bluetooth. The device 310 may send currently displayed media data of the screen A to the device such as the device 340 through the Bluetooth connection. The device such as the device 340 may also display the media data of the screen A. This may be understood as implementing of a projection function.

As shown in FIG. 3, the device 310 may further discover a device such as the device 350 in a wired or wireless manner. For the wired or wireless manner, refer to the descriptions of the first connection. After discovering the device such as the device 350, the device 310 may establish a connection, for example, the second connection, to the device such as the device 350 in a wired or wireless manner.

The media data may include but is not limited to data such as an image, a video, audio, and a layer. After receiving the media data of the screen A, any device may output the media data through an audio module such as a display and/or a speaker.

However, the device such as the device 320 or the device 330 cannot perform screen sharing with the device such as the device 340 or the device such as the device 350. Screen sharing has a high requirement and a small sharing scope. This limits an application scenario of the screen sharing.

Embodiments of this application provide a screen sharing method, to implement screen sharing between the device such as the device 320 or the device 330 that establishes the first connection to the device 310 and the device such as the device 340 and the device such as the device 350 that do not establish a first connection to the device 310. For example, a screen of the device 340 that establishes the second connection to the device 310 may be shared with the device such as the device 320 or the device 330 that establishes the first connection to the device 310. In this case, the device 310 may display the screen A, the device such as the device 320 and the device 330 and the device such as the device 340 may display a shared screen B. In this way, cross-device screen sharing is implemented, a scope and content of sharing between devices are extended, and an application scenario is wider.

The screen in this application may be understood as a user interface (user interface, UI), and may include a window of at least one application. An electronic device can display only one screen at any moment, and a user may operate the electronic device based on the displayed screen. The displayed screen may be referred to as a main display. Content of the main display is visible to the user and can be interacted. In some embodiments, the electronic device may alternatively include at least one virtual display, and content of the virtual display is invisible to the user and cannot be interacted. Screen sharing in this application may be understood as sending media data of the main display or the virtual display.

The following describes, based on the communication system shown in FIG. 3, an application scenario in embodiments of this application and a user interface embodiment in the application scenario. In addition to the split-screen interface shown in FIG. 11, the following embodiments are described by using an example in which one screen/user interface includes a window of one application.

FIG. 4 is an example of a schematic diagram of a user interface.

As shown in FIG. 4, a first device and a second device may establish a first connection. For example, the first device may be the device 310 shown in FIG. 3, and the second device may be any one of devices such as the device 320 and the device 330 that establish the first connection to the device 310. For details, refer to the descriptions in FIG. 3. In some embodiments, a conference application may be installed on both the first device and the second device, and the first device and the second device join a same conference by using the conference application. The first device and the second device may be connected and communicate with each other through a server of the conference application.

As shown in (A) in FIG. 4, the first device may display the user interface 410 of the conference application, and the user interface 410 may include a conference name 411 (that is, "Conference room 123"), a leave option 412, an attendee account 413, and a conference option 414.

One conference name 411 identifies one conference, and different conferences correspond to different conference names 411.

The leave option 412 is used to exit the current conference. The first device may receive a user operation (for example, a touch operation) performed on the leave option 412. In response to the user operation, the first device may exit the current conference. In this case, the first device cannot share a screen with the second device through the server of the conference application.

One attendee account 413 identifies one user, and different users may correspond to different attendee accounts 413. An attendee account 413 (namely, "Account A") in the user interface 410 may identify a user A that uses the first device.

The conference option 414 may include an audio option 414A, a video option 414B, a share option 414C, an attendee option 414D, and a more option 414E. The audio option 414A may be used to turn off or turn on a microphone of the first device. The video option 414B may be used to turn off or turn on a camera of the first device. The share option 414C may be used to enable a screen sharing function. The attendee option 414D may be used to view an attendee account of a user who joins the current conference, for example, may view an attendee account (that is, an attendee account 422: "Account B" shown in (B) in FIG. 4) of a user B that uses the second device.

As shown in (B) in FIG. 4, the second device may display a user interface 420 of the conference application. A conference name 421 is the same as the conference name 411 in the user interface 410, which represents that the first device and the second device have joined the same conference. The attendee account 422 may identify the user B that uses the second device. The user interface 420 is similar to the user interface 410. For details, refer to the descriptions of the user interface 410.

In some embodiments, the first device may receive a user operation (for example, a touch operation) performed on the share option 414C, and in response to the user operation, the first device may display an option of at least one shareable screen. A specific example is shown in FIG. 5(A) to FIG. 5(B)-2.

Figure 5A:
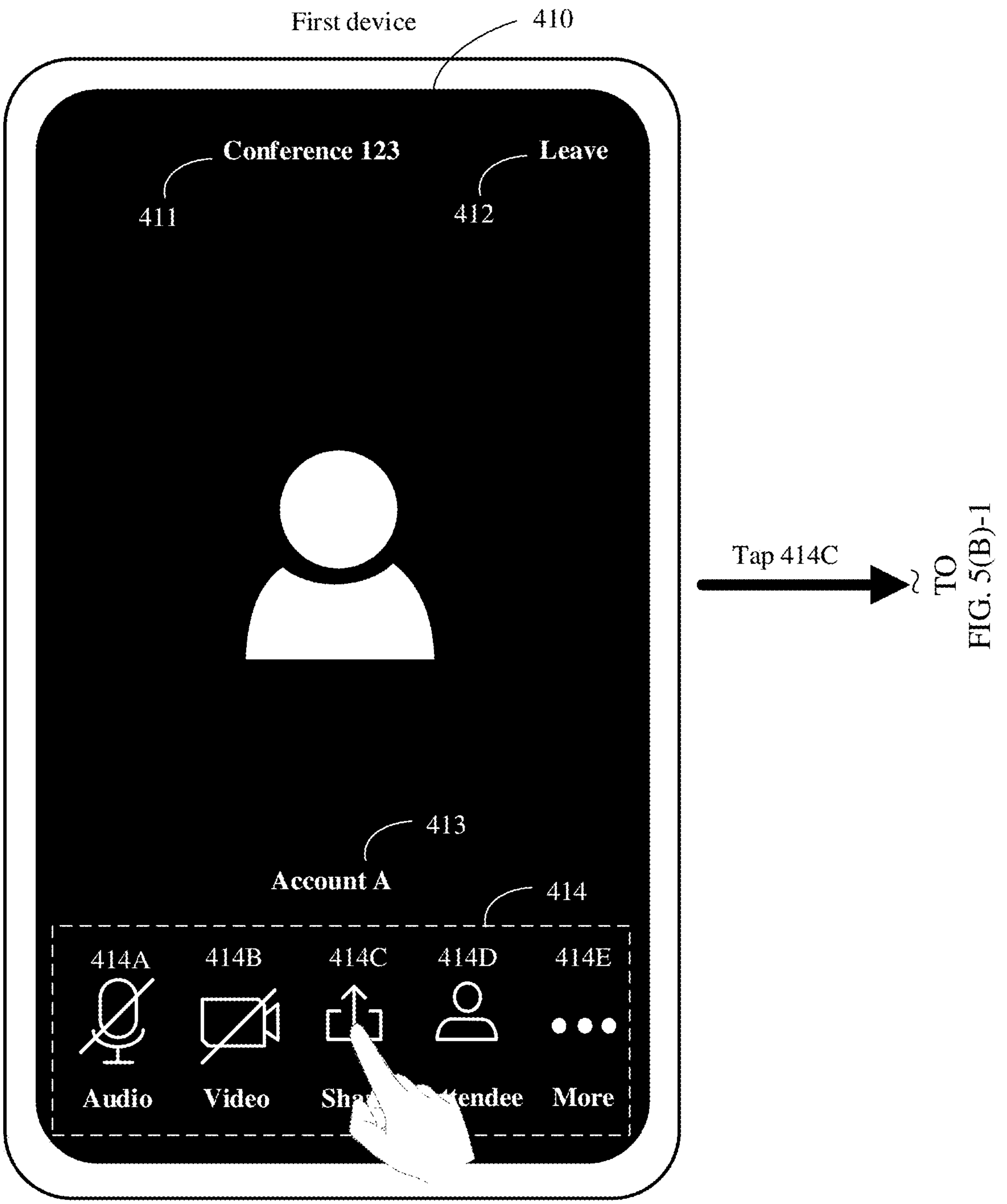
Figures 1, 5B:
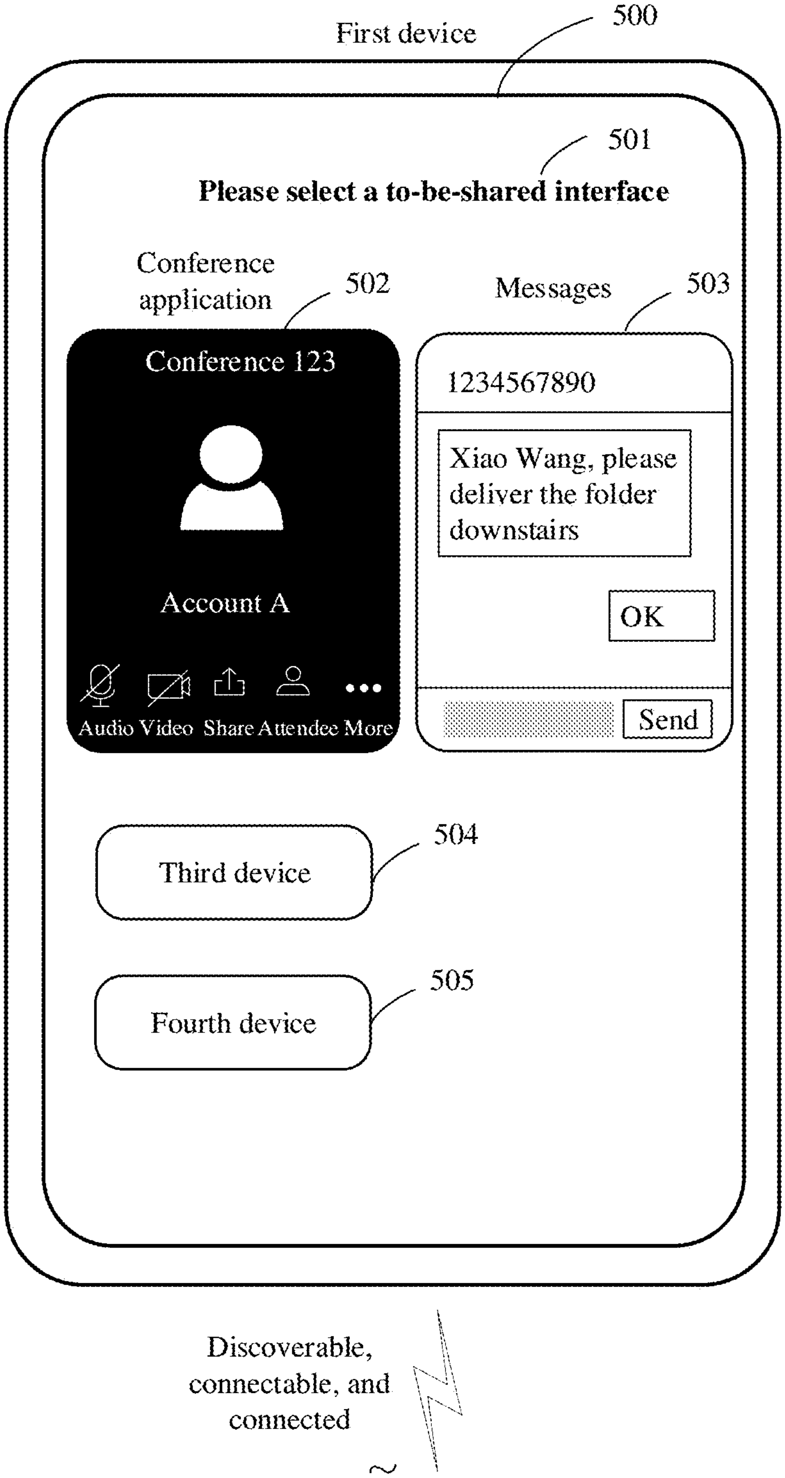
Figures 1, 2, 5B:
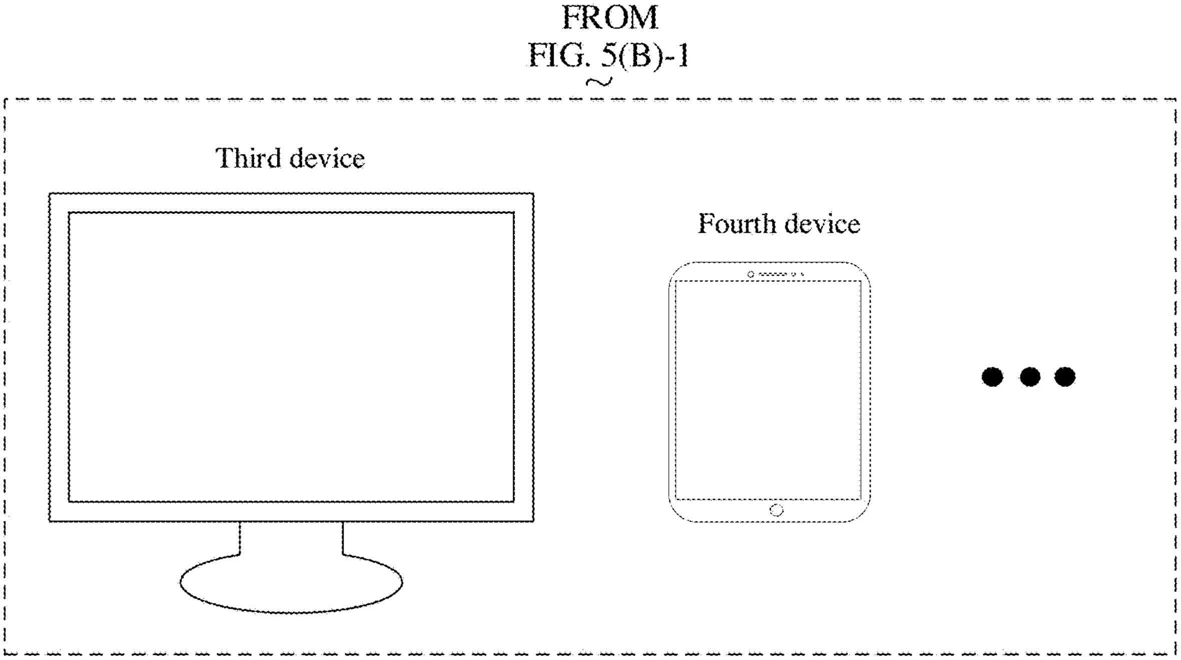

FIG. 5(A) to FIG. 5(B)-2 are an example of a schematic diagram of another user interface. FIG. 5(A) shows the user interface 410 before the share option 414C is tapped, and FIG. 5(B)-1 and FIG. 5(B)-2 show a user interface 500 after the share option 414C is tapped.

As shown in FIG. 5(B)-1 and FIG. 5(B)-2, the first device may display the user interface 500. The user interface 500 may include prompt information 501 (that is, "Please select a to-be-shared interface"), and the prompt information 501 prompts the user to select a to-be-shared screen/interface in the user interface 500. The user interface 500 may also include an option of a shareable screen on the first device. The first device may run at least one application. A main display of the first device may display a user interface of any one of the at least one application, and any screen that is shareable on the first device may be the user interface of any one of the at least one application. It is assumed that the first device runs the conference application and Messages, and the option, in the user interface 500, of a shareable screen on the first device may include a screen option 502 of the conference application and a screen option 503 of Messages. The first device may receive a user operation (for example, a touch operation) performed on any screen option, and share, with the second device in response to the user operation, a user interface of an application corresponding to the option.

The user interface 500 may further include an option of a nearby device of the first device. The nearby device may be a device that is discoverable, connectable, or connected to the first device in a wired or wireless manner. For example, the first device may be the device 310 shown in FIG. 3. The nearby device may include the device such as the device 340 that establishes the second connection to the device 310, or the device such as the device 350 that can be discovered by the device 310. For details, refer to the descriptions in FIG. 3. It is assumed that the nearby device of the first device includes a third device and a fourth device, and the user interface 500 may include an option 504 of the third device and an option 505 of the fourth device. The first device may receive a user operation (for example, a touch operation) performed on any device option, and display, in response to the user operation, an option of a shareable screen on a device corresponding to the option. An option of a shareable screen on the nearby device of the first device is similar to the option of the shareable screen on the first device.

In some embodiments, when displaying the user interface 500 shown in FIG. 5(B)-1 and FIG. 5(B)-2, the first device may receive a user operation (for example, a touch operation) performed on the option 504 of the third device. In response to the user operation, the first device may display an option of at least one shareable screen that is on the third device. A specific example is shown in FIG. 6.

Figure 6:
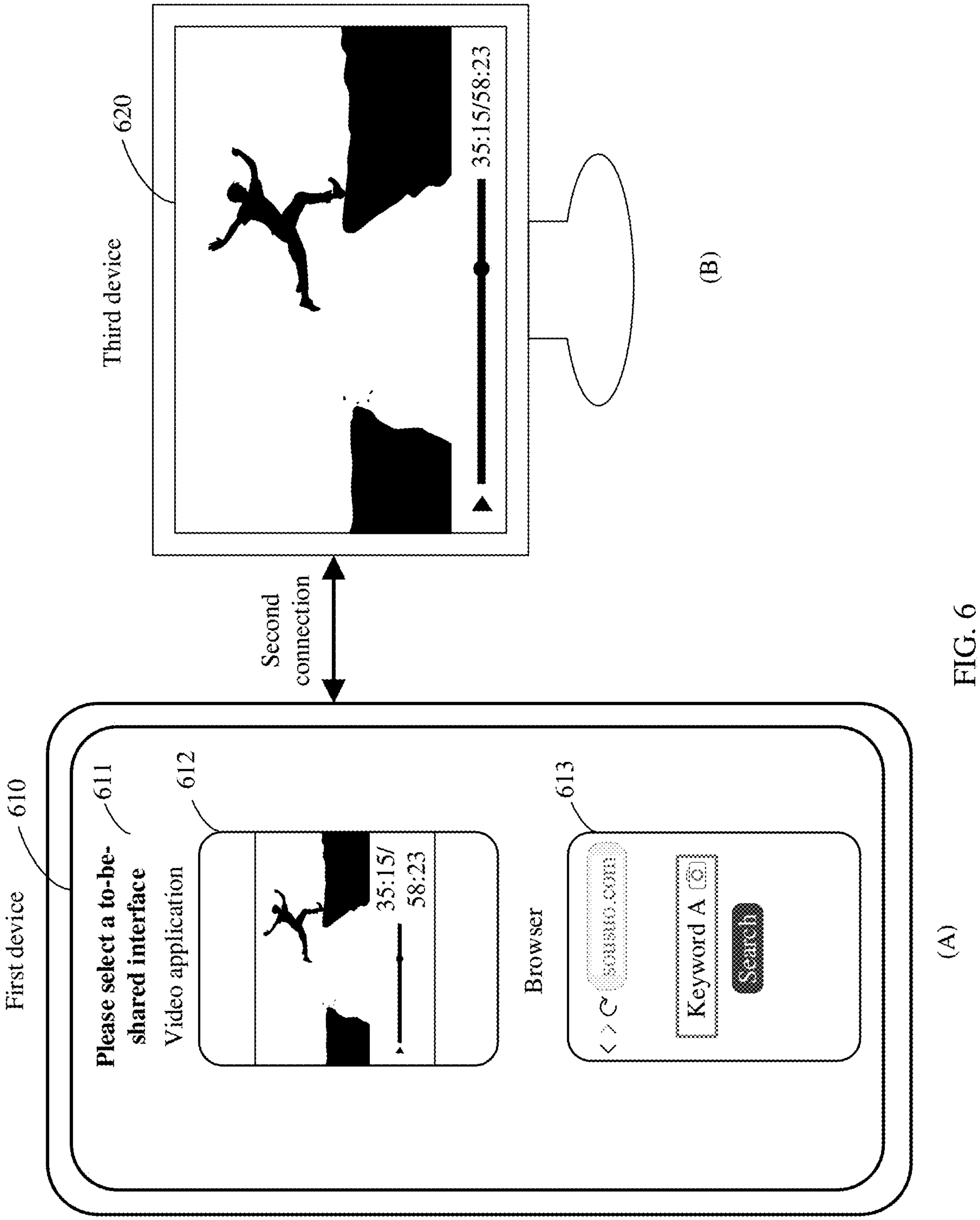

FIG. 6 is an example of a schematic diagram of still another user interface.

As shown in FIG. 6, the first device and the third device may establish a second connection, and the second connection is different from the first connection. For example, the first device may be the device 310 shown in FIG. 3, and the third device may be any device such as the device 340 that establishes the second connection to the device 310. For details, refer to the descriptions in FIG. 3. In some embodiments, device authentication may be performed in a process in which the first device and the third device establish the second connection. For example, the second connection is a Bluetooth connection, and the first device and the third device may verify a Bluetooth address and an access key of each other. Alternatively, the second connection is a Wi-Fi connection, and the first device and the third device may verify an internet protocol address (internet protocol address, IP) and an access key of each other. In some embodiments, the second connection is established before the first device receives the user operation performed on the option 504 of the third device. In some other embodiments, the second connection is established after the first device receives the user operation performed on the option 504 of the third device. For example, the first device may establish the second connection to the third device in response to the user operation.

After the first device establishes the second connection to the third device, the first device may obtain, through the second connection, task information of the third device, that is, information about at least one application running on the third device, for example, but not limited to at least one of the following: a name of the application and image data (which may be referred to as a window snapshot) of a user interface recently displayed on the application. Then, the first device may display, based on the task information of the third device, an option of a shareable screen on the third device, that is, a user interface 610 shown in (A) in FIG. 6.

As shown in (A) in FIG. 6, the first device may display the user interface 610, and the user interface 610 may include prompt information 611 (that is, "Please select a to-be-shared interface") and an option of a shareable screen on the third device. It is assumed that the third device runs a video application and Browser. As shown in (B) in FIG. 6, a main display of the third device is a user interface 620 of the video application, that is, the video application is an application (which may be referred to as a foreground application) that is visible to a user and can be interacted, and an application (for example, Browser) on the main display of the third device is an application (which may be referred to as a background application) that is invisible to the user and cannot be interacted. In the user interface 610, the option of the shareable screen on the third device may include a screen option 612 of the video application and a screen option 613 of Browser.

In some embodiments, the first device may receive a user operation (for example, a touch operation) performed on any option of a shareable screen on the third device, and share, with the second device in response to the user operation, a user interface corresponding to the option. In other words, the first device may share the user interface on the third device that has established the second connection with the second device that has established the first connection. For a specific example, refer to embodiments shown in FIG. 7 to FIG. 11.

In some embodiments, the first device may receive a user operation (for example, a touch operation) performed on the screen option 613 of Browser, and in response to the user operation, the first device may display a selection interface of a sharing manner of the user interface of Browser. A specific example is shown in FIG. 7.

Figure 7:
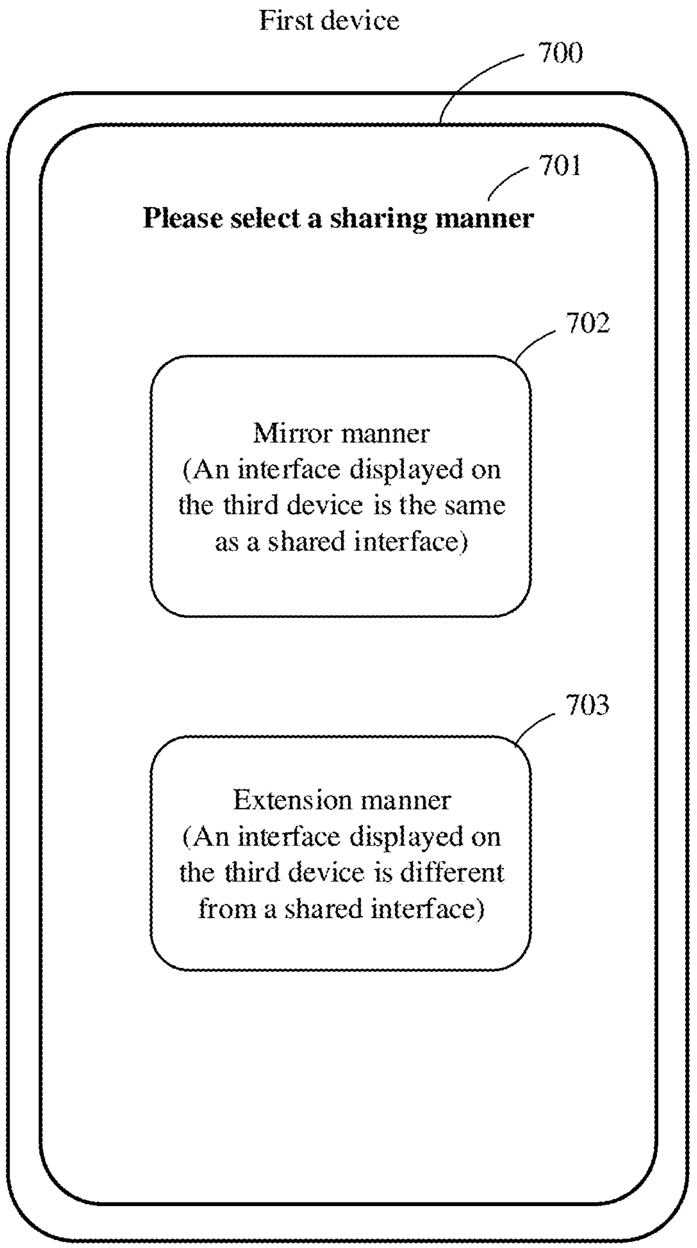

FIG. 7 is an example of a schematic diagram of yet another user interface.

As shown in FIG. 7, the first device may display a user interface 700, and the user interface 700 may include prompt information 701 (that is, "Please select a sharing manner"), a mirror option 702, and an extension option 703.

The mirror option 702 is used to set the sharing manner to a mirror manner. When the sharing manner is the mirroring manner, an interface displayed on the third device (which may be understood as a shared source) and an interface displayed on the second device (which may be understood as a shared target) are the same, which may be understood as image synchronization. The first device may receive a user operation (for example, a touch operation) performed on the mirror option 702, and share, in response to the user operation, the user interface of Browser on the third device with the second device that has joined "Conference room 123", and the main display of the third device is switched from the user interface of the video application to a shared interface: the user interface of Browser. For a specific example, refer to FIG. 8.

Figure 8:
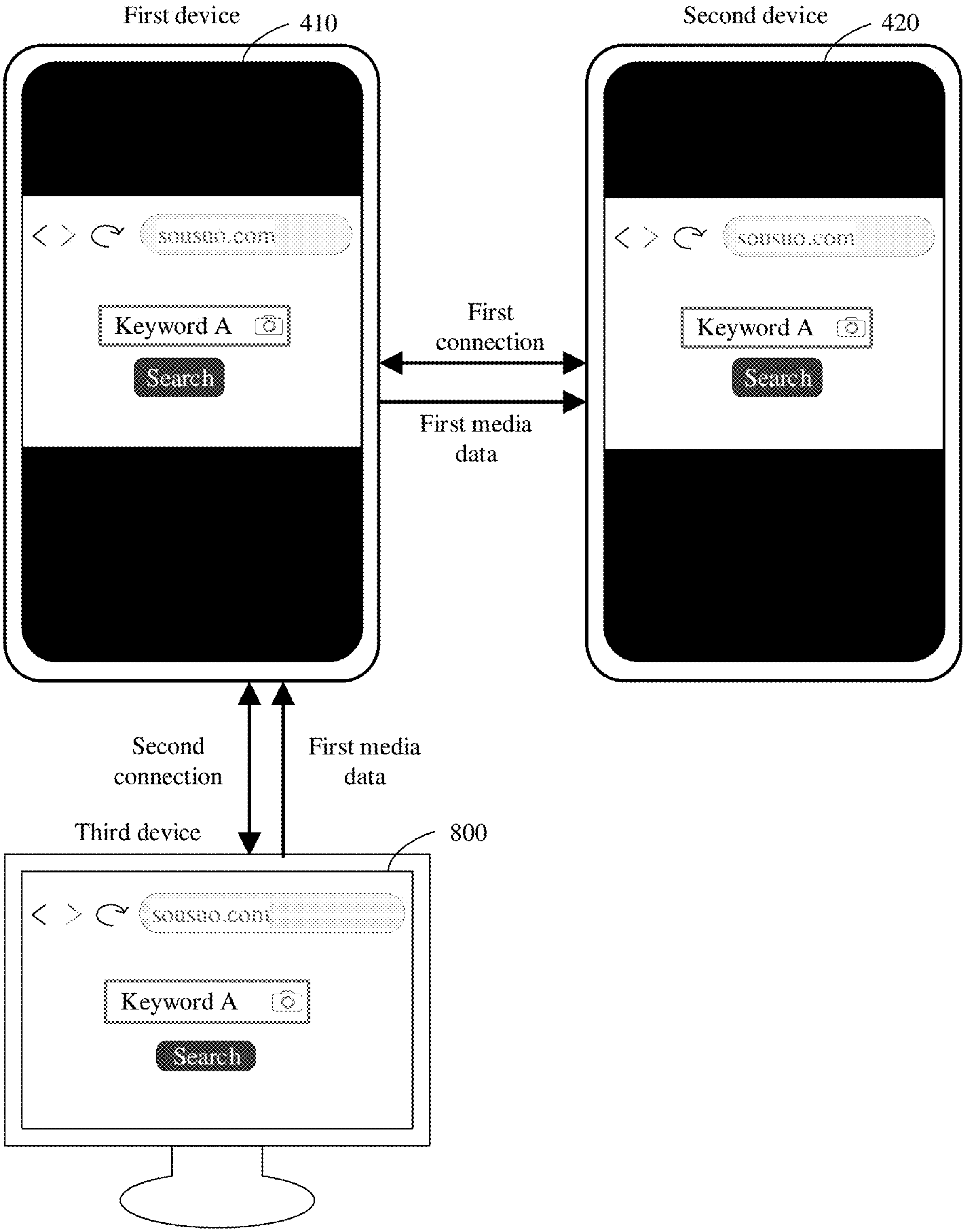

The extension option 703 is used to set the sharing manner to an extension manner. When the sharing manner is the extension manner, an interface displayed on the third device (which may be understood as a shared source) and an interface displayed on the second device (which may be understood as a shared target) may be different, which may be understood as image asynchronization. The first device may receive a user operation (for example, a touch operation) performed on the extension option 703, and share, in response to the user operation, the user interface of Browser on the third device with the second device that has joined "Conference room 123", and the main display of the third device keeps displaying the user interface of the video application. For a specific example, refer to FIG. 9A and FIG. 9B. FIG. 8 is an example of a schematic diagram of still yet another user interface.

As shown in FIG. 8, when determining that the shared interface is the user interface of Browser and the sharing manner is the mirror manner, the first device may send a first notification message to the third device through the second connection, where the first notification message may indicate that the shared interface is the user interface of Browser and indicate that the sharing manner is the mirror manner. In response to the first notification message, the third device may switch the main display from the user interface of the video application to the shared interface: the user interface 800 of the browser, to ensure that the main display is the shared interface. In addition, the third device may send the first media data of the user interface 800 of Browser to the first device through the second connection in response to the first notification message. After receiving the first media data, the first device may output the first media data by using the conference application, that is, display a user interface 410. After receiving the first media data, the first device may send the first media data to the second device through the first connection. After receiving the first media data, the second device may also output the first media data by using the conference application, that is, display a user interface 420. Compared with the user interface 410 and the user interface 420 shown in FIG. 4, the user interface 410 and the user interface 420 hide other content, and display only the shared interface.

As shown in FIG. 8, the first device may receive a user operation performed on the shared interface, for example, an operation of tapping a search control. The first device may send an event corresponding to the user operation to the third device through the second connection. The third device may perform a corresponding operation based on the event. For example, the third device searches for and displays information related to "Keyword A" in Browser. After the third device performs the corresponding operation, the user interface (that is, the shared interface) of Browser may be updated, and the third device may send media data of an updated shared interface to the first device through the second connection. The first device may independently display the updated shared interface, and send the media data of the updated shared interface to the second device, so that the second device also displays the updated shared interface. The third device may also receive and respond to a user operation performed on the main display. A user may operate the shared screen by using the first device or the third device, so that use is more flexible.

In some embodiments, the third device may receive a user operation used to switch a display interface, and switch, in response to the user operation, a user interface displayed on the main display from the shared interface (that is, the user interface 800 of Browser) to a user interface of another application. Optionally, the third device may create, in response to the user operation, a virtual display to display the shared interface. After the foregoing user operation is received, the third device may display the shared interface on the virtual display, and display the user interface of the another application on the main display, and the first device and the second device may still display the shared interface shown in FIG. 8. For example, the another application is a video application, and states of the first device, the second device, and the third device in the foregoing case are shown in FIG. 9A and FIG. 9B.

Figure 9A:
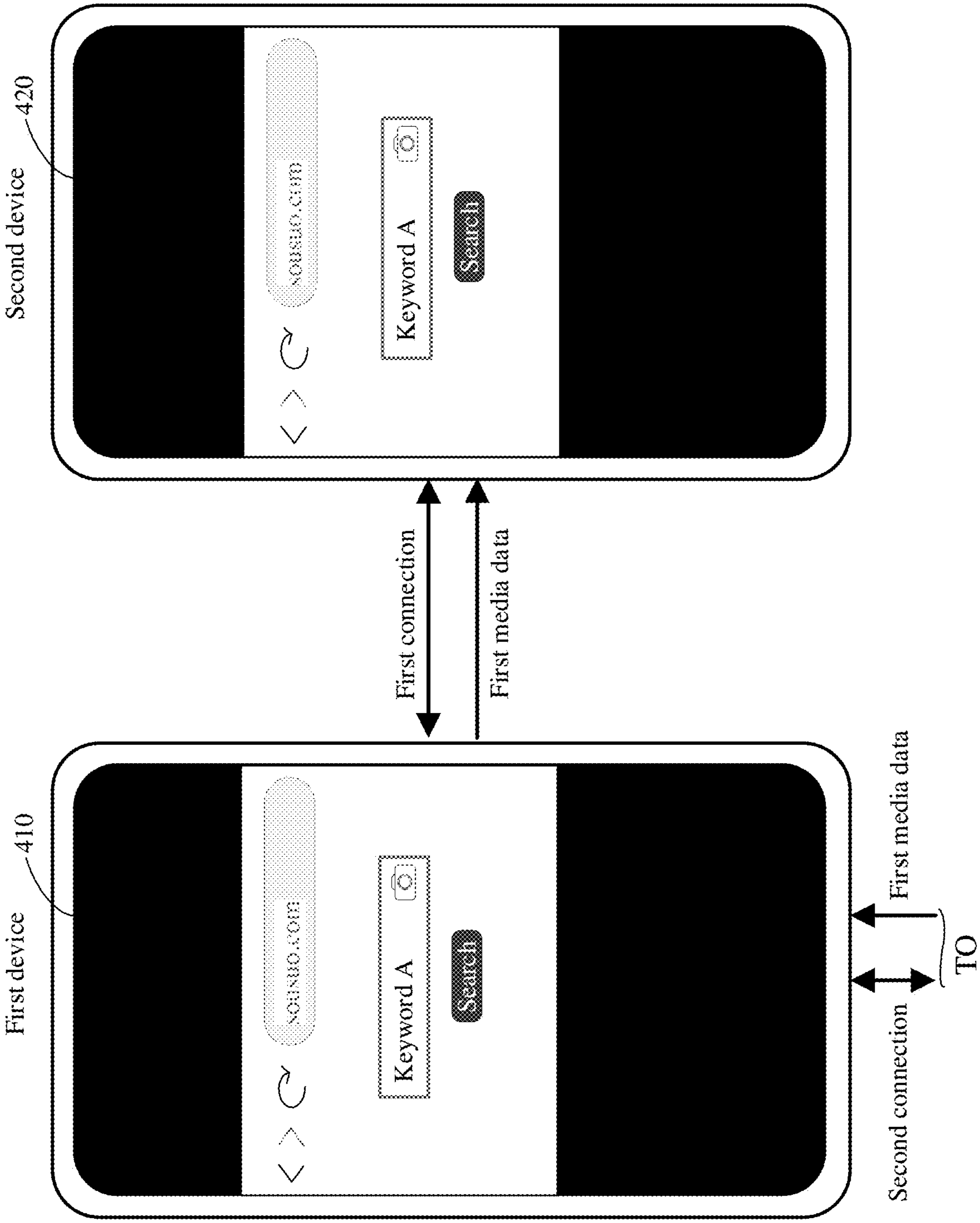
Figure 9B:
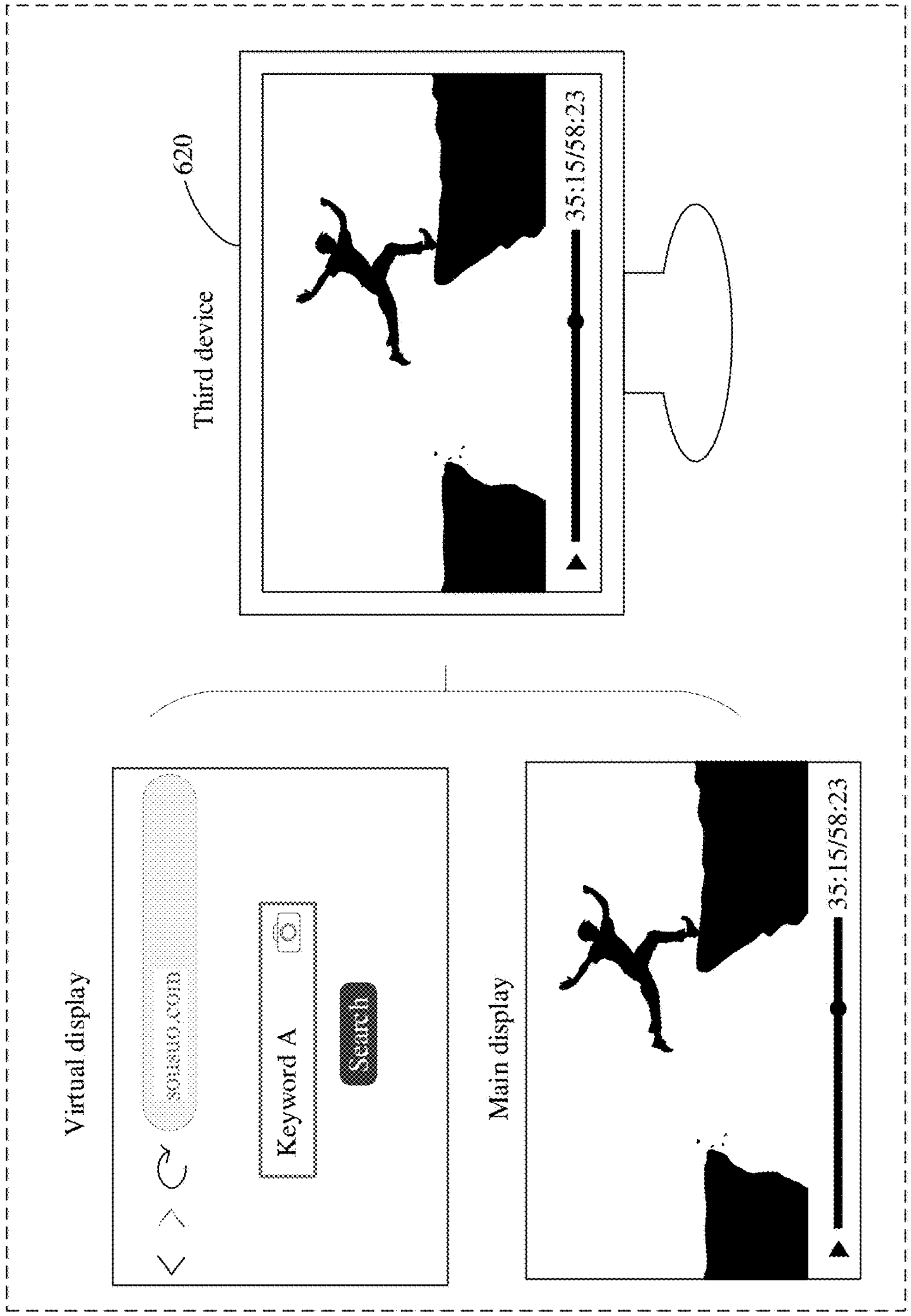

FIG. 9A and FIG. 9B are an example of a schematic diagram of still yet another user interface.

As shown in FIG. 9A and FIG. 9B, when determining that the shared interface is the user interface of Browser and the sharing manner is the extension manner, the first device may send a second notification message to the third device through the second connection, where the second notification message may indicate that the shared interface is the user interface of Browser and indicate that the sharing manner is the extension manner. In response to the second notification message, the third device may display, on a virtual display, the shared interface: the user interface of Browser, and keep displaying the user interface 620 of the video application on the main display. A size of the virtual display may be consistent with a size of the main display of the first device. In some embodiments, when the first device establishes the second connection to the third device (for example, during device authentication or capability negotiation), the first device may send the size of the main display of the first device to the third device. In some embodiments, the virtual display for displaying the shared interface may be created by the third device in response to the second notification message. In some other embodiments, the virtual display may be created before the third device receives the second notification message.

In addition, the third device may send first media data of the user interface 800 of Browser to the first device through the second connection in response to the second notification message. After receiving the first media data, the first device may output the first media data by using the conference application, that is, display a user interface 410. After receiving the first media data, the first device may send the first media data to the second device through the first connection. After receiving the first media data, the second device may also output the first media data by using the conference application, that is, display a user interface 420.

As shown in FIG. 9A and FIG. 9B, when the main display of the third device is an interface other than the shared interface, the first device may receive a user operation performed on the shared interface, for example, an operation of tapping a search control. The first device may send an event corresponding to the user operation to the third device through the second connection. The third device may perform a corresponding operation based on the event. For example, the third device searches for and displays information related to "Keyword A" in Browser. After the third device performs the corresponding operation, the user interface (that is, the shared interface) of Browser may be updated, and the third device may send media data of an updated shared interface to the first device through the second connection. The first device may independently display the updated shared interface, and send the media data of the updated shared interface to the second device, so that the second device also displays the updated shared interface. The operation on the shared interface does not affect the main display of the third device, and the user may also operate the main display of the third device, so that use is more flexible.

In some embodiments, the third device may receive a user operation used to switch a display interface, and switch, in response to the user operation, a user interface displayed on the main display from the user interface 620 of the video application to the shared interface (that is, the user interface of Browser). Optionally, the third device may delete the virtual display in response to the foregoing user operation. After the foregoing user operation is received, the third device may display the shared interface on the main display, and the first device and the second device may still display the shared interface shown in FIG. 9A and FIG. 9B. For example, in the foregoing case, states of the first device, the second device, and the third device are shown in FIG. 8.

In some embodiments, the third device may receive a user operation used to switch a display interface, and switch, in response to the user operation, a user interface displayed on the main display from the user interface 620 of the video application to a user interface of another application, where the another application is an application other than Browser and the video application. After the foregoing user operation is received, the third device may display the user interface of the another application on the main display, and still display the shared interface (that is, the user interface of Browser) on the virtual display, and the first device and the second device may still display the shared interface shown in FIG. 9A and FIG. 9B.

In some embodiments, the electronic device may include no virtual display, and includes only one main display, where the main display is a user interface of a foreground application. It may be understood that the electronic device may draw only the user interface of the foreground application, and does not draw a user interface of a background application in advance. In this case, the sharing manner may be the mirror manner. In some other embodiments, the electronic device may include at least one virtual display. A user interface on the virtual display is invisible to a user and cannot be interacted. It may be understood that the virtual display is a user interface of a background application. The background application herein may be a part or all of a background application running on the electronic device. In this case, the sharing manner may be the extension manner.

In some embodiments, the foreground application of the first device may also be another application other than the conference application, for example, Messages. A specific example is shown in FIG. 10.

Figure 10:
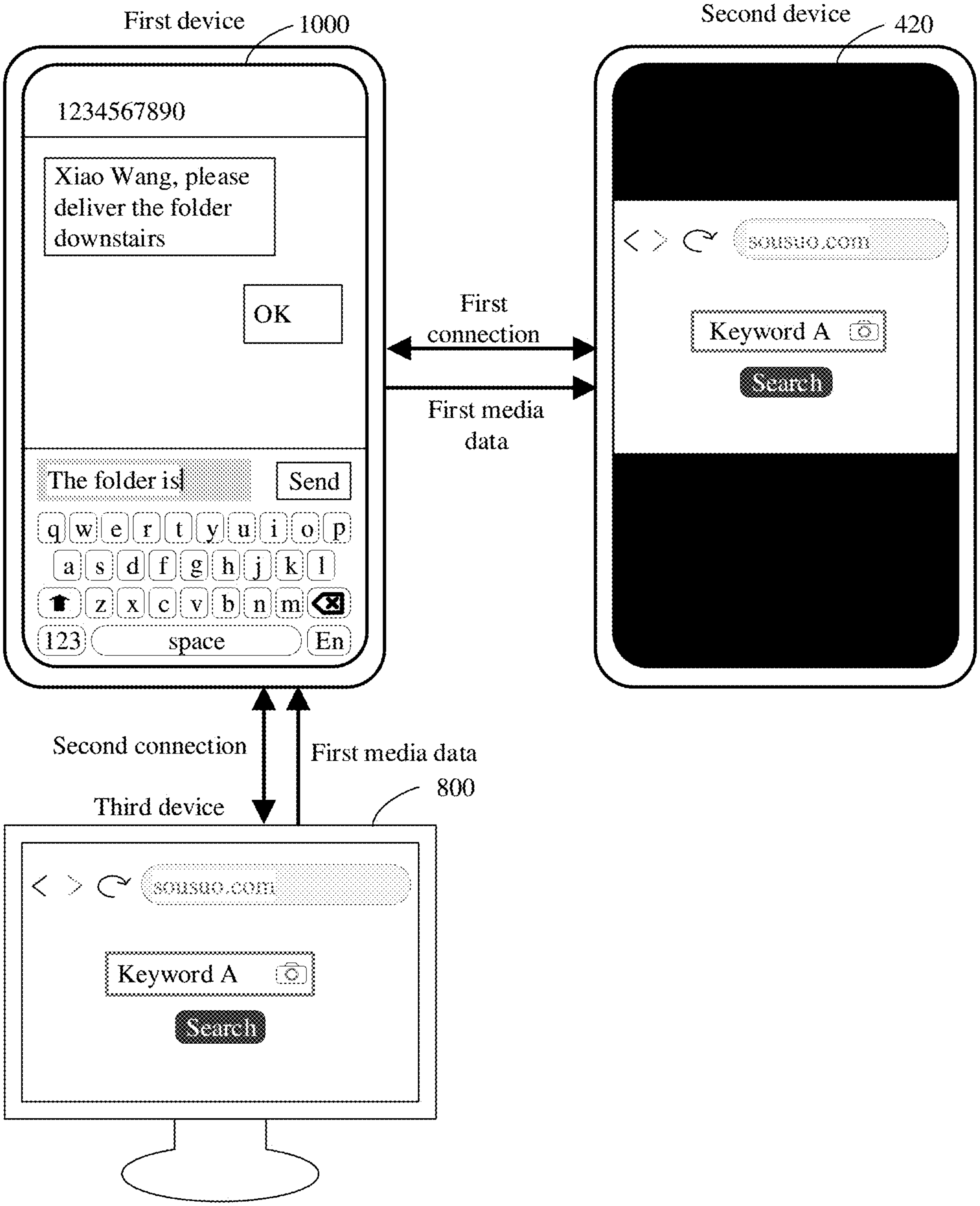

FIG. 10 is an example of a schematic diagram of still yet another user interface.

As shown in FIG. 10, when both the second device and the third device display the user interface (that is, the shared interface) of Browser on the third device, the first device may display a user interface 1000 of Messages. In some embodiments, after receiving the first media data that is of the user interface of Browser and that is sent by the third device, the first device may not output the first media data on the main display, but forward, through the first connection, the first media data to the second device for output. In this case, the first device may keep the display interface unchanged, for example, display the user interface 410 of the conference application shown in (A) in FIG. 4. Then, the first device may receive a user operation used to switch a display interface, and may switch the foreground application from the conference application to Messages in response to the user operation, as shown in FIG. 10. In some other embodiments, in a case shown in FIG. 8, the first device may receive user operations, for example, an operation of sliding up from a bottom edge of a screen (an operation of returning to a home screen in gesture navigation) and an operation of tapping an icon of Messages on the home screen, or an operation of sliding up from a bottom edge of a screen and pausing (an operation of entering recent tasks in gesture navigation) and an operation of tapping a task option corresponding to Messages in a recent tasks list. The first device may switch the foreground application from the conference application to Messages in response to the user operation, as shown in FIG. 10. In some other embodiments, in a case shown in FIG. 9A and FIG. 9B, the first device may also switch the foreground application from the conference application to Messages in response to a user operation, and in response to a user operation, the third device may switch the main display from the user interface of the video application to the shared interface: the user interface of Browser, as shown in FIG. 10. An example of the user operation is similar to the foregoing example of the user operation of switching the foreground application of the first device from the conference application to Messages.

As shown in FIG. 10, a user may view and operate the shared interface on the third device, to interact with a user of the second device. In addition, a user may also use the first device to view and operate another interface, so that use is more flexible.

In some other embodiments, the first device may also simultaneously display the shared interface and another interface in a manner such as a split-screen manner or a floating window manner. A specific example is shown in FIG. 11.

Figure 11:
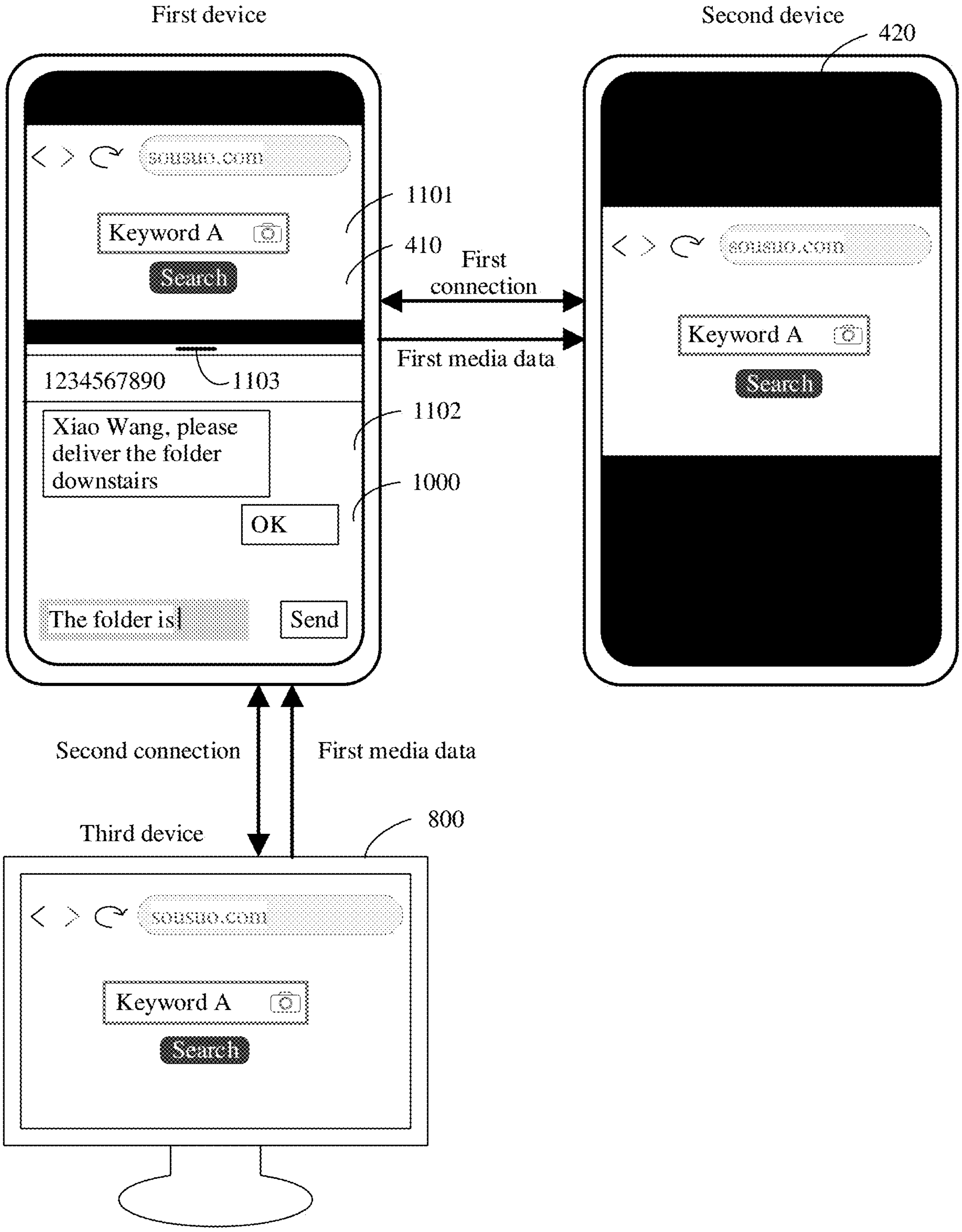

FIG. 11 is an example of a schematic diagram of still yet another user interface.

As shown in FIG. 11, the first device may display a shared interface and another interface on in a split-screen manner. The split-screen interface displayed by the first device may include two windows from top to bottom: a first window 1101 and a second window 1102, and a moving control 1103 between the two windows. The first device displays the user interface 410 of the conference application in the first window 1101, displays, on the user interface 410 of the conference application, the shared interface: a user interface of Browser, and displays a user interface 1000 of Messages in the second window 1102. The moving control 1103 is used to adjust relative sizes of the first window 1101 and the second window 1102. For example, when the moving control 1103 is moved upward, the first window 1101 becomes smaller, and the second window 1102 becomes larger.

In some embodiments, after receiving the first media data that is of the user interface of Browser and that is sent by the third device, the first device may output the first media data on the main display, and forward, through the first connection, the first media data to the second device for output. For this case, refer to FIG. 8. Then, the first device may receive a user operation used to implement screen splitting, for example, an operation of sliding three fingers upward from a bottom edge of a screen and an operation of tapping a screen splitting option. In response to the user operation, the first device may enable a screen splitting function, display an upper window and a lower window, and separately display a shared interface and another interface on the two windows, as shown in FIG. 11. In some other embodiments, in a case shown in FIG. 9A and FIG. 9B, the first device may also enable a screen splitting function in response to a user operation used to implement screen splitting. In addition, the third device may switch, in response to the user operation, the main display from the user interface of the video application to the shared interface: the user interface of Browser, as shown in FIG. 11. In some other embodiments, in a case shown in FIG. 10, the first device may also enable a screen splitting function in response to a user operation used to implement screen splitting, which is shown in FIG. 11.

As shown in FIG. 11, the first device may receive a user operation performed on the shared interface displayed in the first window 1101, for example, an operation of tapping a search control. The first device may send an event corresponding to the user operation to the third device through the second connection. The third device may perform a corresponding operation based on the event. For example, the third device searches for and displays information related to "Keyword A" in Browser. After the third device performs the corresponding operation, the user interface (that is, the shared interface) of Browser may be updated, and the third device may send media data of an updated shared interface to the first device through the second connection. The first device may display the updated shared interface in the first window 1101, and send the media data of the updated shared interface to the second device, so that the second device also displays the updated shared interface. The third device may also receive and respond to a user operation performed on the main display. A user may view and operate the shared interfaces on the first device and the third device, to interact with a user of the second device. In addition, a user may also use the first device to view and operate another interface, so that use is more flexible.

In some other embodiments, the first device may also share the user interface on the first device with the second device that has established the first connection and the third device that has established the second connection. For a specific example, refer to embodiments shown in FIG. 12 to FIG. 14(B).

In some embodiments, when displaying the user interface 500 shown in FIG. 5(B)-1 and FIG. 5(B)-2, the first device may receive a user operation (for example, a touch operation) performed on the screen option 502 of the conference application. In response to the user operation, the first device may display an interface for selecting a sharing manner of the user interface of the conference application. A specific example is shown in FIG. 12.

In some embodiments, for example, in a case shown in FIG. 10 or FIG. 11, the third device may receive a user operation used to switch a display interface, and switch, in response to the user operation, a user interface displayed on the main display from the shared interface (that is, the user interface 800 of Browser) to a user interface of another application. Optionally, the third device may create, in response to the user operation, a virtual display to display the shared interface. After the foregoing user operation is received, the third device may display the shared interface (that is, the user interface of Browser) on the virtual display, and display the user interface of the another application on the main display, the first device may keep the display interface unchanged (for example, the user interface 1000 of Messages is unchanged in FIG. 10, and the split screen is unchanged in FIG. 11), and the second device may still display the shared interface shown in FIG. 10.

Figure 12:
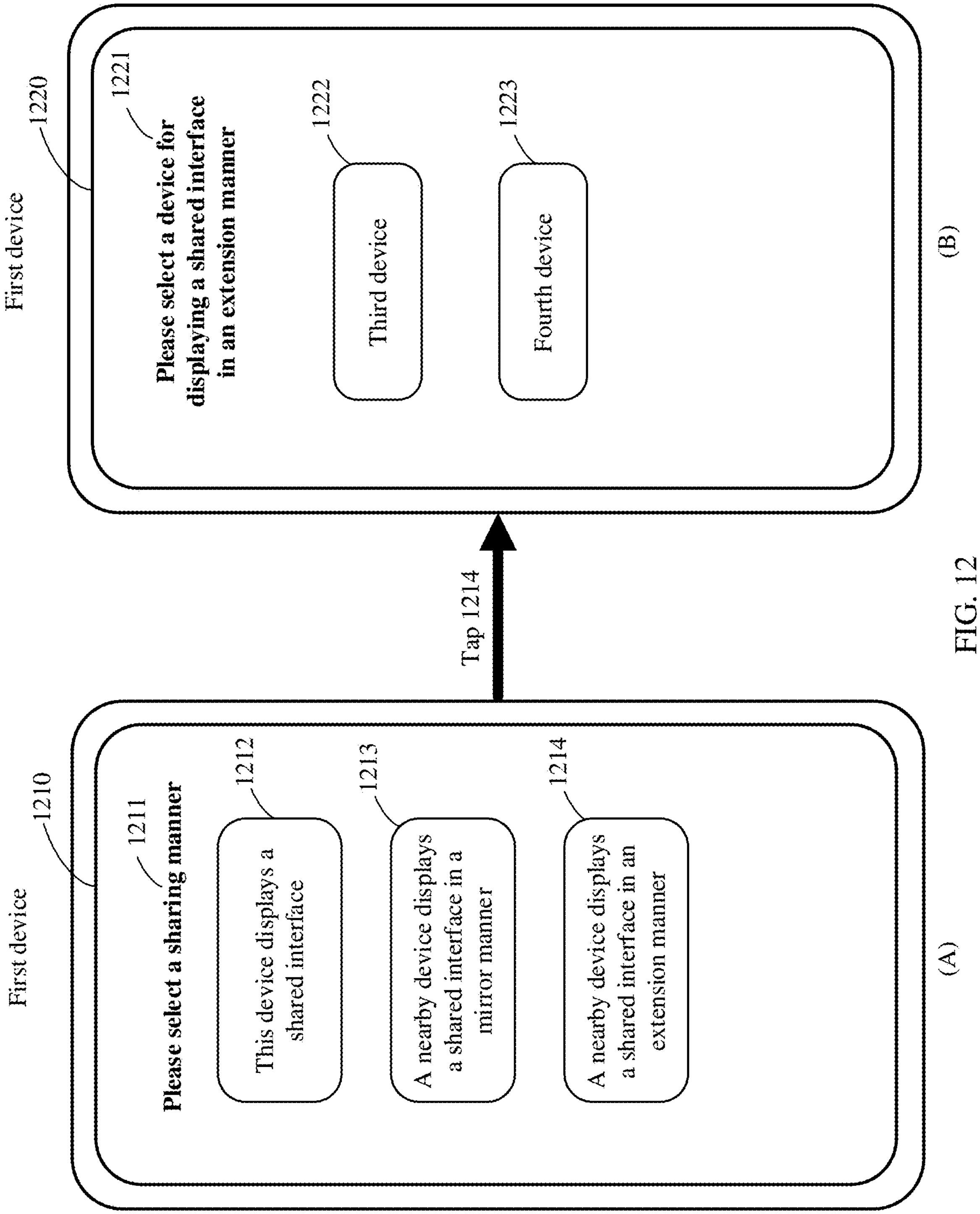

FIG. 12 is an example of a schematic diagram of yet another user interface.

As shown in (A) in FIG. 12, the first device may display a user interface 1210, and the user interface 1210 may include prompt information 1211 (that is, "Please select a sharing manner"), a first option 1212, a second option 1213, and a third option 1214.

The first option 1212 is used to set the sharing manner to the following: An interface displayed on the first device (which may be understood as a shared source) and an interface displayed on the second device (which may be understood as a shared target) are the same, which may be understood that images of the shared source and the shared target are synchronous. The first device may receive a user operation (for example, a touch operation) performed on the first option 1212. In response to the user operation, the first device shares the user interface of the conference application on the first device with the second device, and keeps displaying the user interface of the conference application on the main display of the first device.

The second option 1213 is used to set the sharing manner to the following: An interface displayed on the first device (which may be understood as a shared source) and an interface displayed on the second device (which may be understood as a shared target) are the same, and the interface displayed on the first device and an interface displayed on a nearby device are the same, which may also be understood that images of the shared source, the nearby device, and the shared target are synchronous. The first device may receive a user operation (for example, a touch operation) performed on the second option 1213. In response to the user operation, the first device not only shares the user interface of the conference application on the first device with the second device, but also shares the user interface with a nearby device, and keeps displaying the user interface of the conference application on the main display of the first device. In some embodiments, the nearby device may be a part or all of a nearby device preset by the first device. In some other embodiments, the nearby device may be determined by the first device based on a user operation. For example, the first device may receive a user operation (for example, a touch operation) performed on the second option 1213, and display, in response to the user operation, an option of the nearby device that can display a shared interface in a mirrored manner. A specific example is similar to (B) in FIG. 12.

The third option 1214 is used to set the sharing manner to the following: An interface displayed on a nearby device of the first device (which may be understood as a shared source) and an interface displayed on the second device (which may be understood as a shared target) are the same, and an interface displayed on the first device is different from the interface displayed on the nearby device, which may also be understood that images of the shared source and the shared target are asynchronous, and images of the nearby device of the shared source and the shared target are synchronous. In some embodiments, the nearby device may be a part or all a nearby device preset by the first device. The first device may receive a user operation (for example, a touch operation) performed on the third option 1214, and in response to the user operation, not only share the user interface of the conference application on the first device with the second device, but also share the user interface with the nearby device. In addition, the main display of the first device may display a user interface of another application other than the conference application. In some other embodiments, the nearby device may be determined by the first device based on a user operation. For example, the first device may receive a user operation (for example, a touch operation) performed on the third option 1214, and display, in response to the user operation, an option of a nearby device that can display a shared interface in an extension manner. For details, refer to (B) in FIG. 12.

As shown in (B) in FIG. 12, the first device may display a user interface 1220, and the user interface 1220 may include prompt information 1221 (that is, "Please select a device for displaying a shared interface in an extension manner"), an option 1222 of the third device, and an option 1223 of the fourth device. In some embodiments, the first device may receive a user operation (for example, a touch operation) performed on the option 1222 of the third device, and share, in response to the user operation, the user interface of the conference application on the first device with the third device corresponding to the option, and share the user interface with the second device. It may be understood that the shared interface is simultaneously shared with the second device that joins a same conference and the nearby third device. A specific example is shown in FIG. 13A and FIG. 13B.

Figure 13A:
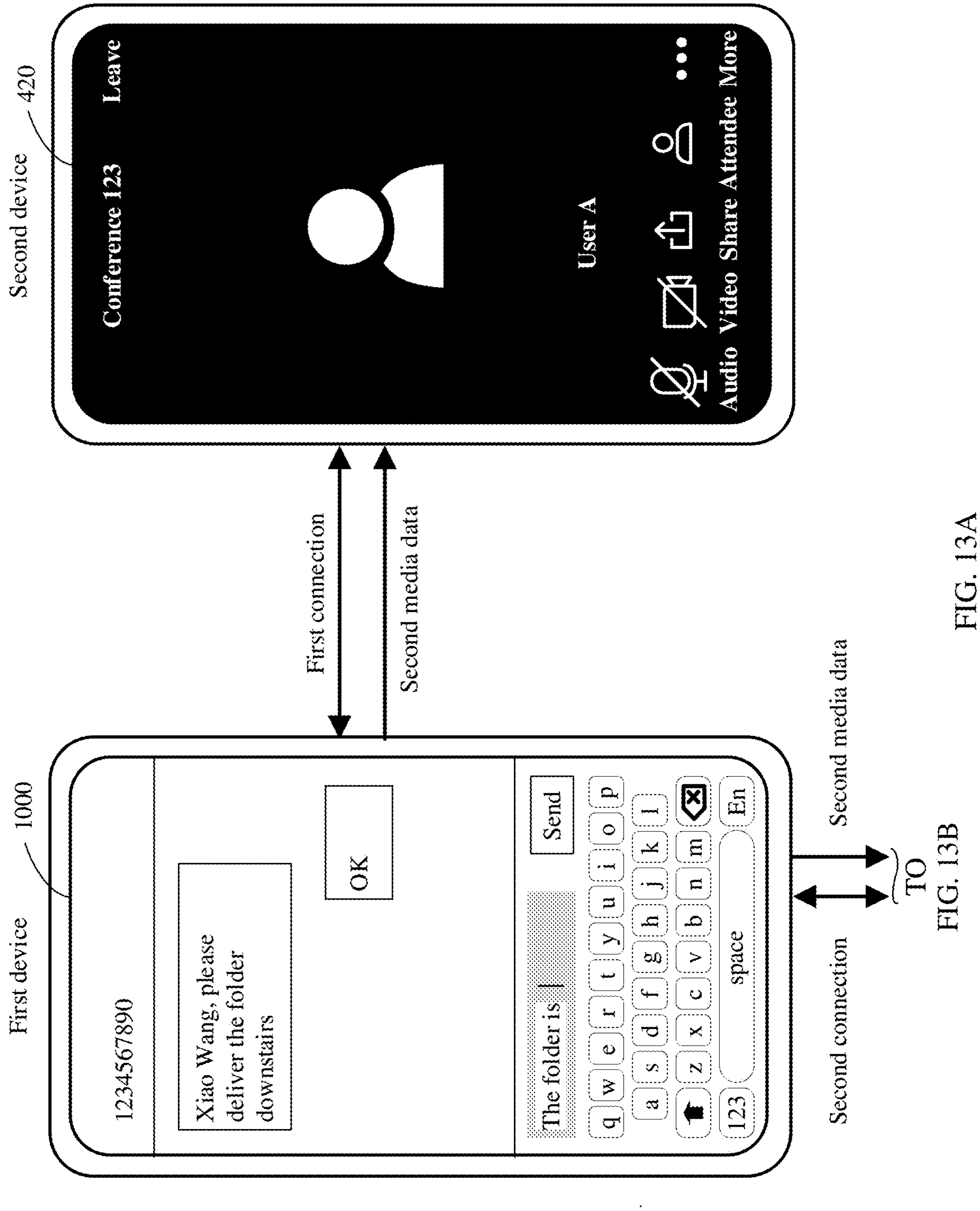
Figure 13B:
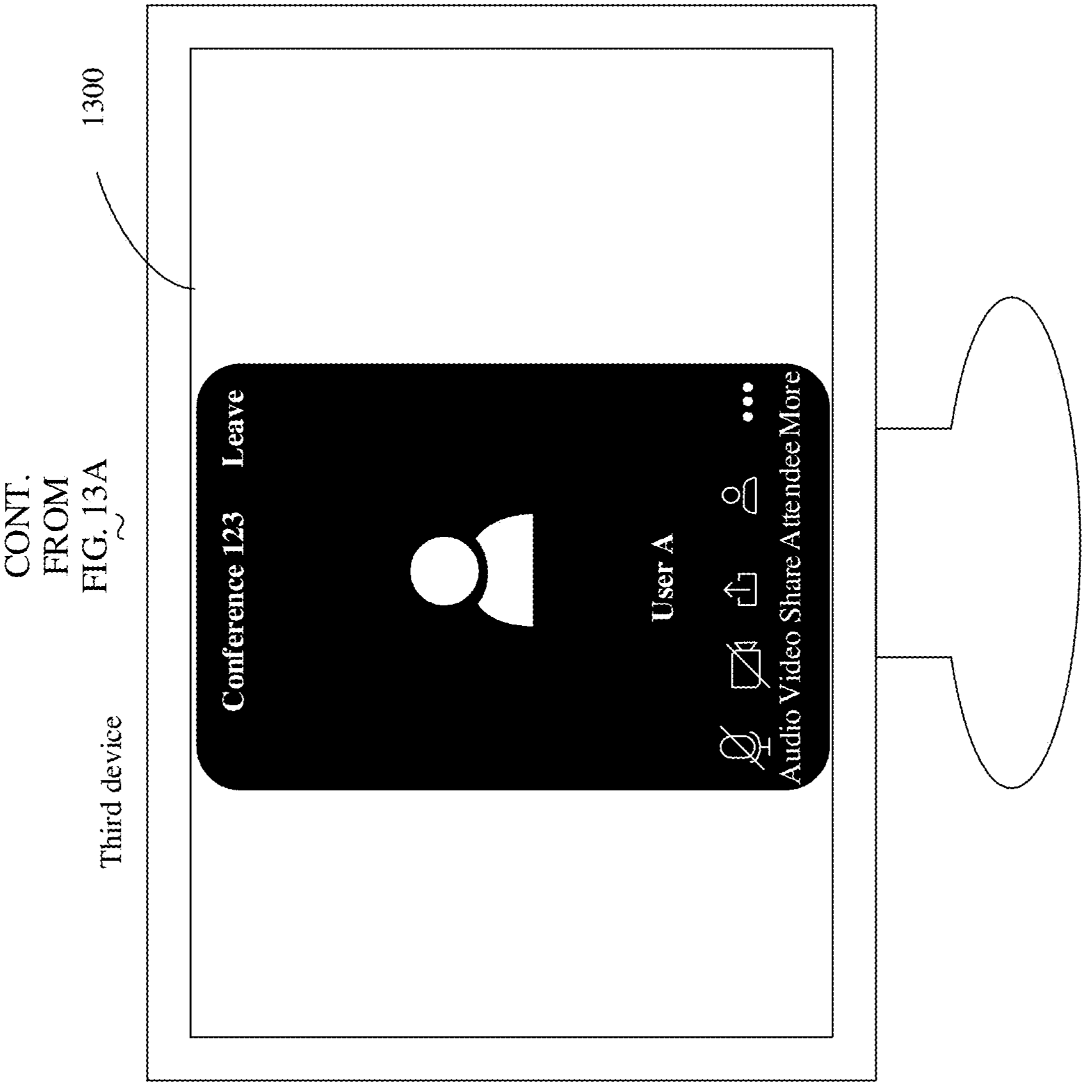

FIG. 13A and FIG. 13B are an example of a schematic diagram of still yet another user interface.

As shown in FIG. 13A and FIG. 13B, when determining that the shared interface is the user interface of the conference application, the first device may send second media data of the user interface (that is, the shared interface) of the conference application on the first device to the second device through the first connection. After receiving the second media data, the second device may also output the second media data by using the conference application, that is, display a user interface 420. Compared with the user interface 420 shown in FIG. 4, the user interface 420 hides other content, and displays only the shared interface. In addition, when the first device determines to share the shared interface with the third device, the first device may send the second media data to the third device through the second connection. After receiving the second media data, the third device may output the second media data on the main display, that is, display a user interface 1300. In this case, the main display of the first device may display a user interface other than the shared interface, for example, the user interface 1000 of Messages.

In some embodiments, when sharing the user interface of the conference application on the first device with the second device and the third device, the first device may keep the display interface unchanged, for example, display the user interface 410 of the conference application shown in (A) in FIG. 4. Then, the first device may receive a user operation used to switch a display interface, and may directly switch a foreground application from the conference application to Messages in response to the user operation, as shown in FIG. 13A and FIG. 13B. In some other embodiments, when sharing the user interface of the conference application on the first device with the second device and the third device, the first device may keep the display interface unchanged, for example, display the user interface 410 of the conference application shown in (A) in FIG. 4. Then, the first device may receive a user operation used to switch a display interface. In response to the user operation, the first device may display prompt information, for example, "Are you sure you want to synchronously switch the display interface of the third device". The first device may receive a user operation that is input by the user based on the prompt information. It is assumed that the first device switches only a display interface of a first interface (a foreground application is switched from the conference application to Messages) in response to the user operation, and keeps the display interface of the third device as a shared interface, as shown in FIG. 13A and FIG. 13B.

When the main display of the first device is a user interface other than the shared interface, the first device may display, on the virtual display, the shared interface: the user interface of the conference application. In some embodiments, the virtual display for displaying the shared interface may be created by the first device in response to a user operation of selecting a sharing manner. The user operation is, for example, a user operation performed on the third option 1214 in the user interface 1210 shown in (A) in FIG. 12, or a user operation performed on the option 1222 of the third device in the user interface 1220 shown in (B) in FIG. 12. In some other embodiments, the virtual display may be created before the first device determines a sharing manner.

As shown in FIG. 13A and FIG. 13B, the third device may receive a user operation performed on the shared interface, for example, an operation of tapping an audio option 414A. The third device may send an event corresponding to the user operation to the first device through the second connection. The first device may perform a corresponding operation based on the event, for example, turn on or turn off a microphone of the first device. After the first device performs the corresponding operation, the user interface (that is, the shared interface) of the conference application may be updated, and the first device may send media data of an updated shared interface to the second device and the third device, so that the second device and the third device may display the updated shared interface. A user may view and operate the shared interface on the third device, to interact with a user of the second device. In addition, a user may also use the first device to view and operate another interface, so that use is more flexible.

In some embodiments, the first device may receive a user operation used to switch a display interface, and switch, in response to the user operation, a user interface displayed on the main display from the user interface 1000 of Messages to the shared interface (that is, the user interface 410 of the conference application). In this case, the first device may display the shared interface on the main display, and the second device and the third device may still display the shared interface shown in FIG. 13A and FIG. 13B. Optionally, the first device may delete the virtual display in response to the user operation. For example, in the foregoing case, states of the first device, the second device, and the third device are shown in FIG. 8.

In some embodiments, the first device may receive a user operation used to switch a display interface, and switch, in response to the user operation, a user interface displayed on the main display from the user interface 1000 of Messages to a user interface of another application, where the another application is an application other than Messages and the conference application. In this case, the first device may display the user interface of the another application on the main display, and still display the shared interface on the virtual display, and the second device and the third device may still display the shared interface shown in FIG. 13A and FIG. 13B.

This is not limited to a case shown in FIG. 12. In some other embodiments, the first device may alternatively determine a sharing manner when determining the shared interface. The sharing manner is, for example, the sharing manner shown in (A) in FIG. 12. A specific example is shown in FIG. 14(A) and FIG. 14(B).

Figure 14A:
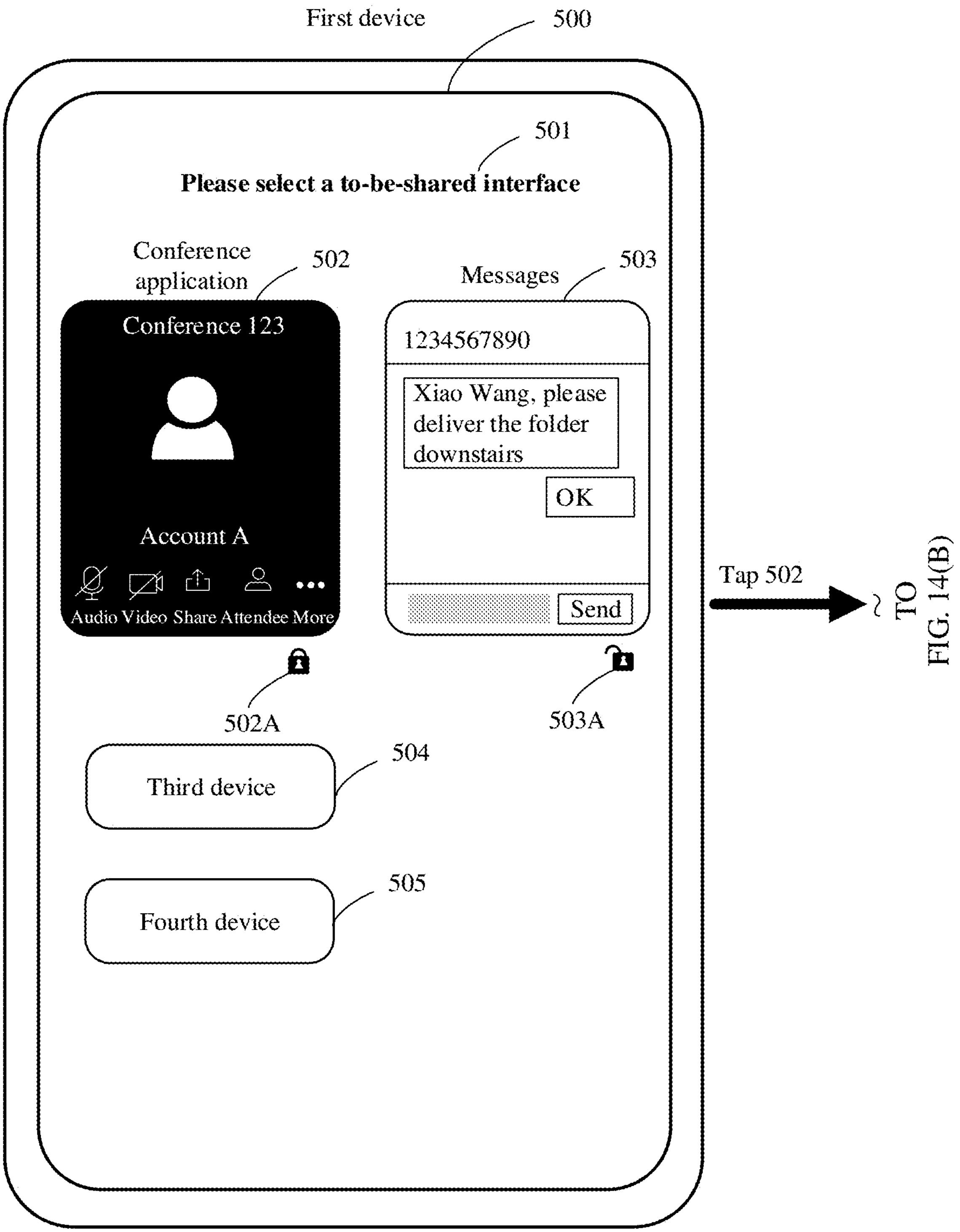
Figure 14B:
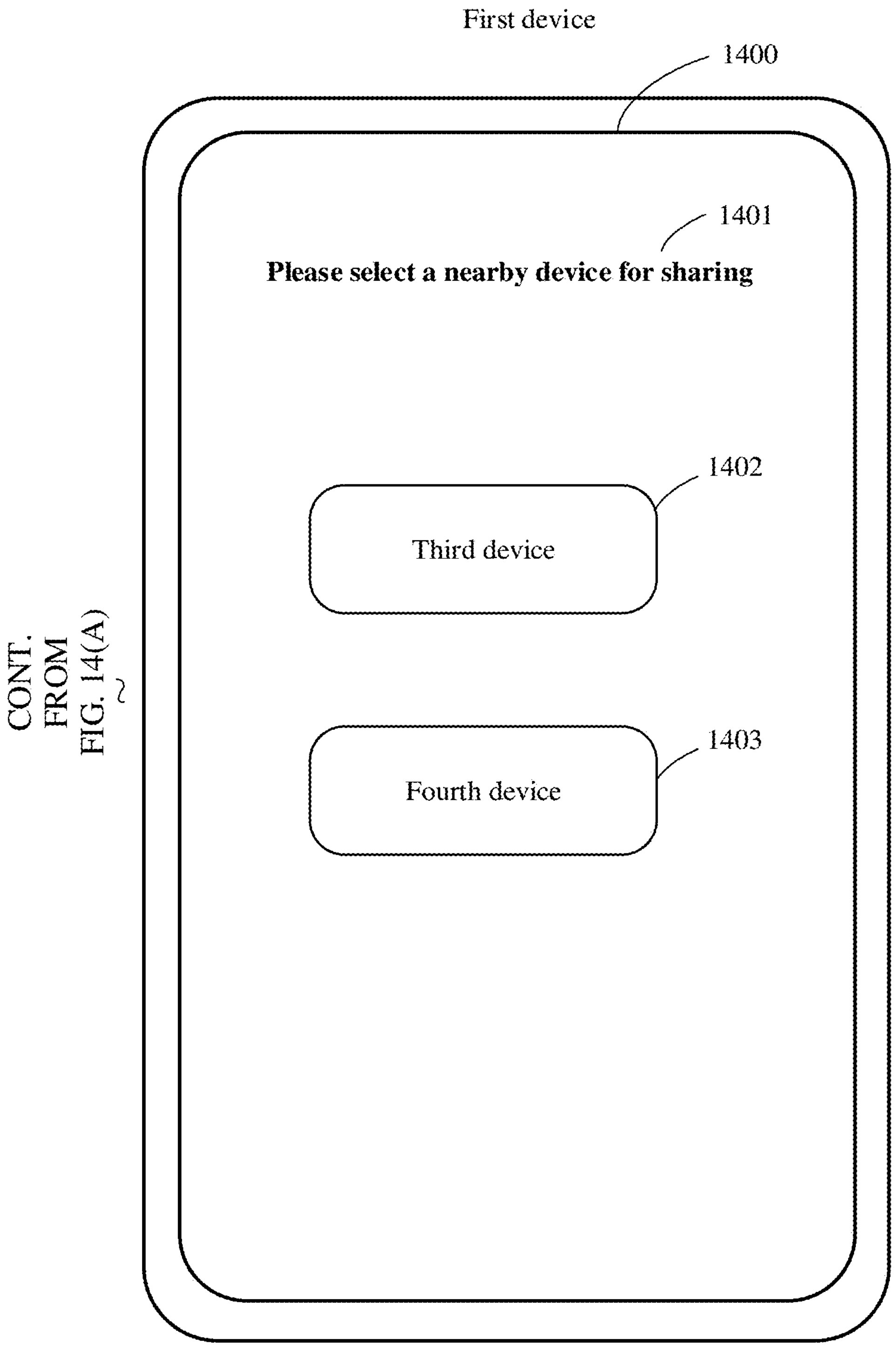

FIG. 14(A) and FIG. 14(B) are an example of a schematic diagram of still another user interface.

As shown in FIG. 14(A), the first device may display a user interface 500. A difference from the user interface 500 shown in FIG. 5(B)-1 and FIG. 5(B)-2 lies in that, in the user interface 500 shown in FIG. 14(A), the option of the shareable screen on the first device further includes a lock option, the screen option 502 of the conference application includes a lock option 502A, and the screen option 503 of Messages includes a lock option 503A. The lock option is used to enable or disable a function of synchronizing (mirroring) a display interface with the first device, for example, which corresponds to the second option 1213 in the user interface 1210 shown in (A) in FIG. 12.

As shown in FIG. 14(A), when the user performs no operation, any lock option in a state shown in the lock option 503A indicates that the function of synchronizing (mirroring) a display interface with the first device is not enabled. The first device may receive a user operation (for example, a touch operation) performed on the lock option 502A. In response to the user operation, the first device may determine, when the shared interface is the user interface of the conference application, that the sharing manner is displaying the shared interface in a synchronous (mirror) manner by a nearby device and the first device. Then, the first device may receive a user operation (for example, a touch operation) performed on the screen option 502 of the conference application. In response to the user operation, the first device may determine that the shared interface is the user interface of the conference application, and the first device may display a selection interface of a nearby device that performs screen sharing, for example, a user interface 1400 shown in FIG. 14(B).

As shown in FIG. 14(B), the first device may display the user interface 1400, and the user interface 1400 may include prompt information 1401 (that is, "Please select a nearby device for sharing"), an option 1402 of the third device, and an option 1403 of the fourth device. In some embodiments, the first device may receive a user operation (for example, a touch operation) performed on the option 1402 of the third device, and share, in response to the user operation, the user interface of the conference application on the first device with the third device corresponding to the option, and share the user interface with the second device. It may be understood that the shared interface is simultaneously shared with the second device that joins a same conference and the nearby third device. For a specific example, refer to FIG. 13A and FIG. 13B.

This is not limited to a case shown in FIG. 12. In some other embodiments, the first device may alternatively first share the shared interface with the second device that joins the same conference, and when a preset trigger condition is met, share the shared interface with the nearby device: the third device. For example, when displaying the user interface 500 shown in FIG. 5(B)-1 and FIG. 5(B)-2, the first device may receive a user operation (for example, a touch operation) performed on the screen option 502 of the conference application. In response to the user operation, the first device may directly share the user interface of the conference application on the first device with the second device, that is, send second media data of the user interface of the conference application to the second device through the first connection. After receiving the second media data, the second device may display the user interface 420 shown in FIG. 13A and FIG. 13B. In this case, the first device may also display the user interface of the conference application, that is, the user interface 410 shown in FIG. 4. When the first device determines that the preset trigger condition is met (for example, in a case of receiving a new message, such as receiving a new SMS message, receiving a new incoming call, or receiving a notification message of an application, or in a case of switching a display interface, such as entering a recent tasks screen or returning to a home screen), the first device may display prompt information, for example, "Are you sure you want to share the shared interface with a nearby device". The first device may receive a user operation input by the user based on the prompt information. It is assumed that, in response to the user operation, the first device shares the user interface of the conference application on the first device with the third device, that is, sends the second media data of the user interface of the conference application to the third device through the second connection. After receiving the second media data, the third device may display the user interface 1300 shown in FIG. 13A and FIG. 13B, as shown in FIG. 13A and FIG. 13B.

This is not limited to the foregoing examples. In some other embodiments, when displaying the user interface 610 shown in FIG. 6, the first device may receive a user operation (for example, a touch operation) performed on the screen option 612 of the video application, and determine, in response to the user operation, that the shared interface is the user interface of the video application. In this case, the shared interface is also a main display of the third device. Optionally, when the first device determines that the sharing manner is an extension manner, the first device may share the user interface of the video application on the third device with the second device. In this case, the third device may keep the user interface of the video application as the main display. However, the third device may receive a user operation, and may switch, in response to the user operation, a foreground application to another application other than the video application. However, the shared interface is still the video application, and the third device may display the user interface of the video application on a virtual display. Optionally, a size of the virtual display may be consistent with a size of the main display of the first device, and the third device may re-draw and determine the user interface of the video application based on the size of the virtual display.

This is not limited to the foregoing examples. In some other embodiments, there may be a plurality of nearby devices selected by the user for sharing.

This is not limited to the examples listed above. In some other embodiments, the first device may independently determine a nearby device that shares the user interface on the first device, for example, determine a device closest to the first device as a target device for sharing, or determine a device that recently establishes a connection as a target device for sharing.

It may be understood that, in the foregoing example, because a size of the main display of the third device is different from sizes of main displays of the first device and the second device, after receiving first media data of the user interface of Browser, the first device and the second device each may output the first media data in a part area of the main display, and no content may be displayed in the other area (for example, the other area is displayed in black).

This is not limited to the examples listed above. In some other embodiments, the user interface shared by the third device may alternatively be a user interface displayed on the main display of the third device. For example, as shown in FIG. 8, the third device displays the user interface 800 (that is, the shared interface) of Browser on the main display, and after receiving media data of the shared interface, the first device and the second device display the user interface of Browser. In some embodiments, the third device may receive a user operation used to switch a display interface, and switch, in response to the user operation, a user interface displayed on the main display from the user interface 800 of Browser to a user interface of another application. After the foregoing user operation is received, the third device may display the user interface of the another application on the main display, and display interfaces of the first device and the second device each may also be switched from the user interface of Browser to the user interface of the another application. In some embodiments, the first device may receive a user operation used to switch a display interface, and switch, in response to the user operation, a user interface displayed on the main display from the shared interface to another interface. After receiving the user operation, the first device may display the another interface on the main display, and the second device and the third device may still display the shared interface. For an example of the user interface, refer to FIG. 10 and FIG. 11.

Based on the embodiments shown in FIG. 1 to FIG. 14(B), the following describes a screen sharing method according to an embodiment of this application.

Figure 15:
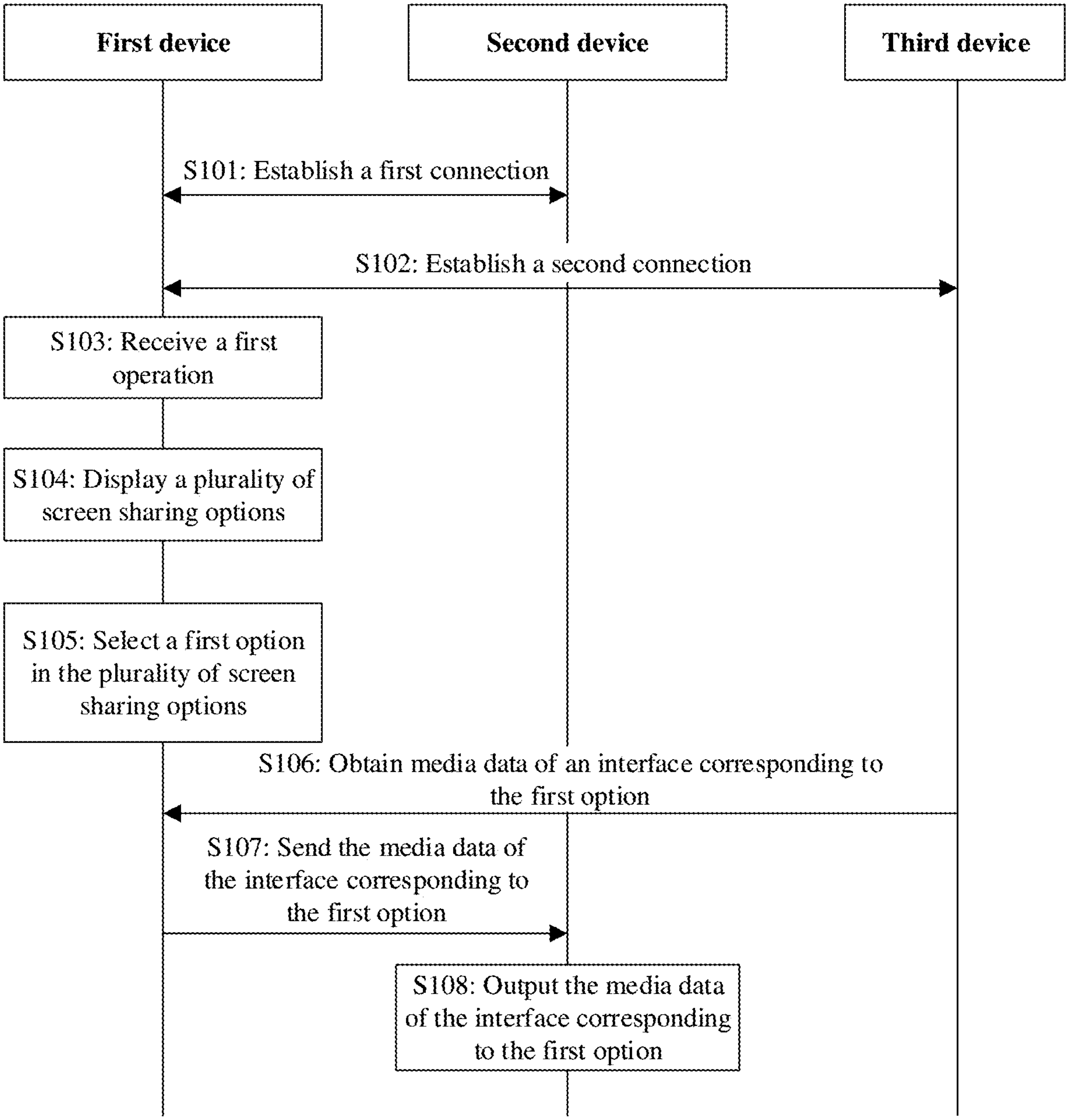
FIG. 15 and FIG. 16 are schematic flowcharts of some screen sharing methods according to embodiments of this application.

FIG. 15 is a schematic flowchart of a screen sharing method according to an embodiment of this application. Any device in the method may be the electronic device 100 shown in FIG. 1. Any device in the method may be the electronic device 100 shown in FIG. 2. The method may be applied to the communication system shown in FIG. 3. The method may include but is not limited to the following steps.

S101: A first device establishes a first connection to a second device.

S102: The first device establishes a second connection to a third device.

Specifically, the first connection and the second connection may be implemented in a wired manner or a wireless manner, and the second connection is different from the first connection. For example, the first device is the device 310 shown in FIG. 3, the second device may be any one of devices such as the device 320 and the device 330 that establish a first connection to the device 310, and the third device may be any one of devices such as the device 340 that establishes a second connection to the device 310 and the device 350 that can be discovered by the device 310. For details, refer to the descriptions in FIG. 3.

For example, the first device may be the first device described in the embodiments shown in FIG. 4 to FIG. 14(B), the second device may be a second device that joins a same conference with the first device, and the third device may be a nearby device of the first device. In S101 and S102, the first device and the second device may be shown in FIG. 4. The first device displays the user interface 410 of the conference application, and the second device displays the user interface 420 of the conference application. The third device may display the user interface 620 of the video application shown in FIG. 6.

S103: The first device receives a first operation.

S104: The first device displays a plurality of screen sharing options.

Specifically, the first operation is used to enable a screen sharing function. In some embodiments, the first device may display the plurality of screen sharing options in response to the first operation. That is, S104 is performed. Optionally, the plurality of screen sharing options may include an option used to indicate a shareable user interface on the first device. Optionally, the plurality of screen sharing options may include an option used to indicate a shareable user interface on the third device. Any shareable user interface may include a window of at least one application running on the device. For example, in the embodiments shown in FIG. 4 to FIG. 14(B), one shareable user interface may include a window of one application.

In some embodiments, the first device may display, based on obtained task information of the third device, options of a shareable user interface that is on the third device. The task information may be information about at least one application run by the device, for example, but is not limited to including at least one of the following: a name of the application, and image data (which may be referred to as a window snapshot) of a window recently displayed on the application. In some embodiments, when the first device establishes the second connection to the third device, the first device may obtain the task information of the third device. In some other embodiments, the first device may obtain the task information of the third device in response to the first operation.

For example, the first operation may be a user operation (for example, a touch operation) performed on the share option 414C of the user interface 410 in FIG. 5(A). The first device may display, in response to the received first operation, a user interface 500 including a plurality of screen sharing options. The user interface 500 may include options used to indicate a shareable user interface on the first device: the screen option 502 of the conference application and the screen option 503 of Messages, and options of nearby devices of the first device: the option 504 of the third device and the option 505 of the fourth device. The nearby device of the first device may be used to share a user interface. In this case, display interfaces of the second device and the third device may remain unchanged, the second device displays the user interface 420 of the conference application, and the third device displays the user interface 620 of the video application shown in FIG. 6.

S105: The first device selects a first option in the plurality of screen sharing options.

Specifically, the first device may receive a second operation, and select the first option in the plurality of screen sharing options in response to the second operation, where the first option indicates a shareable user interface on the third device. In some embodiments, the first device may share, with the second device in response to the second operation, a user interface corresponding to the first option. That is, S106 to S108 are performed. For example, the second operation may include a user operation (for example, a touch operation) performed on the option 504 of the third device in the user interface 500 in FIG. 5(B)-1 and FIG. 5(B)-2, and a user operation (for example, a touch operation) performed on the screen option 612 of the video application or the screen option 613 of Browser in the user interface 610 in (A) in FIG. 6. The first device may determine, in response to the second operation, that the shared interface is the user interface of the video application on the third device or the user interface of Browser, and share the shared interface with the second device (that is, S106 to S108 are performed).

S106: The first device obtains media data of the interface corresponding to the first option from the third device.

S107: The first device sends the media data of the interface corresponding to the first option to the second device.

S108: The second device outputs the media data of the interface corresponding to the first option.

Specifically, the media data may include but is not limited to data such as an image, a video, audio, and a layer. In some embodiments, in response to the second operation, the first device may continuously obtain media data of the interface (that is, the shared interface) corresponding to the first option from the third device through the second connection, and then continuously forward the media data to the second device. The second device may receive and output the media data of the interface corresponding to the first option.

In some embodiments, in S105 to S107, the display interface of the second device may remain unchanged, for example, the display interface is the user interface 420 of the conference application shown in (B) in FIG. 4. In S108, the display interface of the second device may be changed to the shared interface. For example, the first option is the screen option 613 of Browser in the user interface 610 in (A) in FIG. 6, and a user interface (that is, the shared interface) corresponding to the first option is the user interface of Browser on the third device. In this case, as shown in FIG. 8, the second device may display the user interface of Browser on the user interface 420 of the conference application.

In some embodiments, when the second device outputs the media data of the interface corresponding to the first option (that is, when the second device displays the shared interface), the first device and the third device may also display the shared interface. For example, in the embodiment of FIG. 8, the first device displays the user interface of Browser on the user interface 410 of the conference application, the second device displays the user interface of Browser on the user interface 420 of the conference application, and the third device displays the user interface 800 of Browser. Optionally, the first device may display the shared interface after obtaining the media data of the shared interface (for example, after S106, that is, during S107 and S108). Optionally, after sharing the shared interface with the second device, the first device may display the shared interface in response to a received user operation. For example, in S106 to S108, the first device keeps displaying the user interface 410 of the conference application shown in (A) in FIG. 4. After S108, the first device may display prompt information about whether to synchronously display the shared interface. The first device may receive a user operation that is selected by a user based on the prompt information and that is used to synchronously display the shared interface, and display the shared interface in response to the user operation. Optionally, after selecting a second option (that is, after determining the shared interface, that is, after S105), the first device may send a notification message indicating the shared interface to the third device, and the third device may display the shared interface based on the notification message, for example, display the shared interface in S106 to S108.

In some other embodiments, when the second device outputs the media data of the interface corresponding to the first option (that is, when the second device displays the shared interface), the first device may also display the shared interface, and the third device may display another interface. For example, in the embodiment shown in FIG. 9A and FIG. 9B, the first device displays the user interface of Browser on the user interface 410 of the conference application, the second device displays the user interface of Browser on the user interface 420 of the conference application, and the third device displays the user interface 620 of the video application. In this case, a main display is unchanged. Optionally, the another interface displayed on the third device may be an interface that is originally displayed. For example, in the procedure shown in FIG. 15, the third device keeps displaying the user interface 620 of the video application shown in (B) in FIG. 6. Optionally, the another interface displayed on the third device may be displayed in response to a user operation. For example, after S108, the third device may switch a display interface in response to a received user interface.

In some other embodiments, when the second device outputs the media data of the interface corresponding to the first option (that is, when the second device displays the shared interface), the third device may also display the shared interface, and the first device may display another interface. For example, in the embodiment shown in FIG. 10, the first device displays the user interface 1000 of Messages, the second device displays the user interface of Browser on the user interface 420 of the conference application, and the third device displays the user interface 800 of Browser. Optionally, before displaying the another interface, the first device may display the shared interface. For example, after S106, the first device may display the shared interface. Subsequently, the first device may switch a display interface from the shared interface to the another interface in response to a user operation.

In some other embodiments, when the second device outputs the media data of the interface corresponding to the first option (that is, when the second device displays the shared interface), the third device may also display the shared interface, and the first device may display the shared interface and another interface in a split-screen manner. For example, in the embodiment shown in FIG. 11, the first device displays the user interface 410 of the conference application in the first window 1101, displays the user interface of Browser on the user interface 410 of the conference application, and displays the user interface 1000 of Messages in the second window 1102. The second device displays the user interface of Browser on the user interface 420 of the conference application. The third device displays the user interface 800 of Browser. Optionally, before displaying the another interface, the first device may display the shared interface. For example, after S106, the first device may display the shared interface. Subsequently, in response to a user operation, the first device may switch from displaying the shared interface in a full-screen manner to displaying the shared interface and the another interface in a split-screen manner.

This is not limited to the procedure shown in FIG. 15. In some other embodiments, the first device may establish the second connection to the third device in response to the first operation after receiving the first operation.

For an example of implementing the procedure shown in FIG. 15, refer to the embodiments shown in FIG. 4 to FIG. 11.

In the method shown in FIG. 15, after the first device establishes the first connection to the second device, the first device may share, with the second device, a user interface of a nearby device that is discoverable, connectable, or connected, for example, share, with the second device, a user interface of the third device that has established the second connection. In this way, cross-device screen sharing is implemented, content and a scope of screen sharing are extended, and an application scenario is wider.

Figure 16:
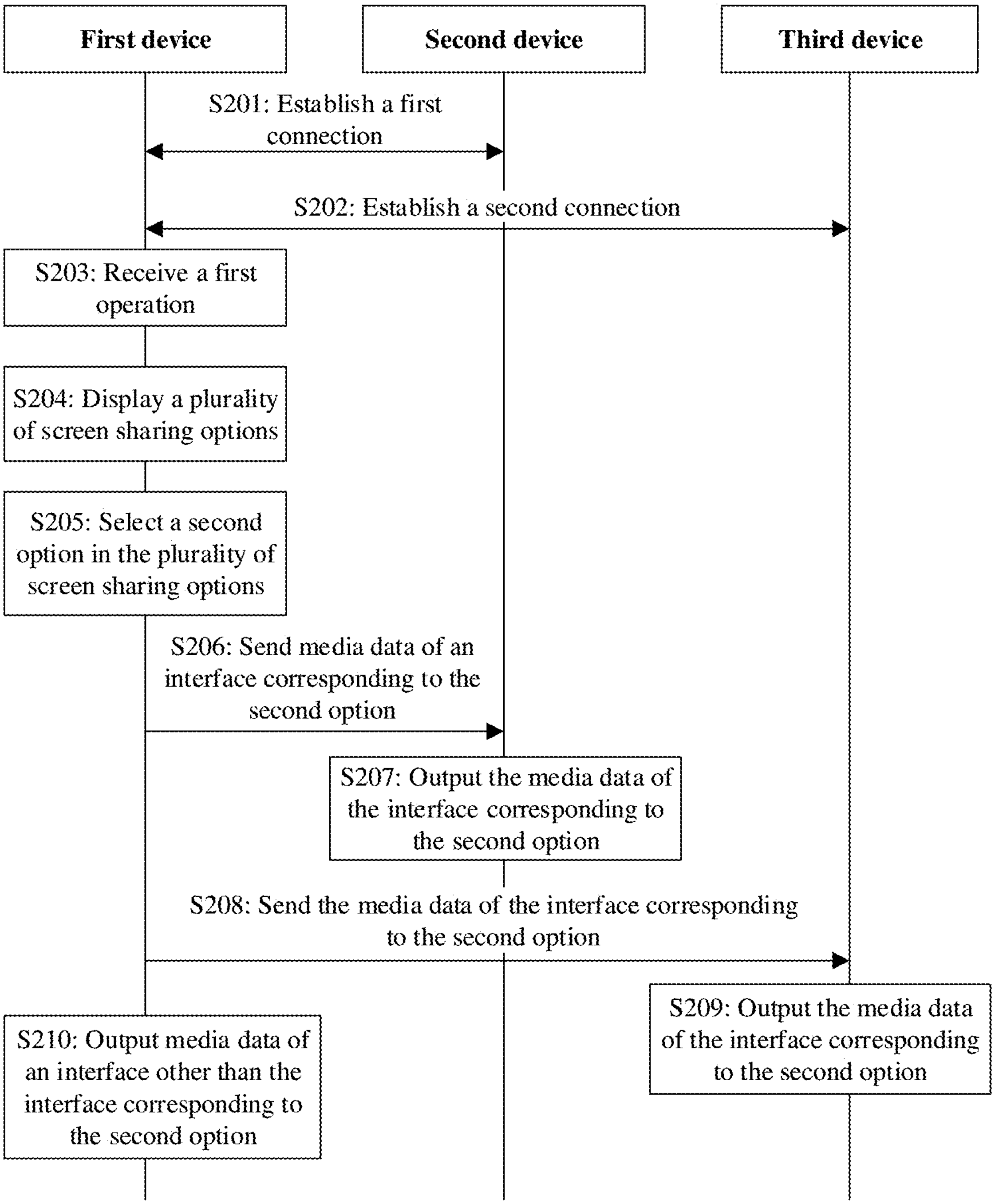

FIG. 16 is a schematic flowchart of another screen sharing method according to an embodiment of this application. Any device in the method may be the electronic device 100 shown in FIG. 1. Any device in the method may be the electronic device 100 shown in FIG. 2. The method may be applied to the communication system shown in FIG. 3. The method may include but is not limited to the following steps.

S201: A first device establishes a first connection to a second device.

S202: The first device establishes a second connection to a third device.

S203: The first device receives a first operation.

S204: The first device displays a plurality of screen sharing options.

Specifically, S201 to S204 are similar to S101 to S104 shown in FIG. 15, and details are not described again.

S205: The first device selects a second option in the plurality of screen sharing options.

Specifically, the first device may receive a third operation, and select the second option in the plurality of screen sharing options in response to the third operation, where the second option indicates a shareable user interface on the first device. In some embodiments, the first device may share, with the second device in response to the third operation, a user interface corresponding to the second option. That is, S206 and S207 are performed. For example, the third operation may include a user operation (for example, a touch operation) performed on the screen option 502 of the conference application or the screen option 503 of Messages in the user interface 500 in FIG. 5(B)-1 and FIG. 5(B)-2. The first device may determine, in response to the third operation, that the shared interface is a user interface of a conference application on the first device or a user interface of Messages, and share the shared interface with the second device (that is, S206 and S207 are performed).

S206: The first device sends media data of the interface corresponding to the second option to the second device.

S207: The second device outputs the media data of the interface corresponding to the second option.

In some embodiments, in S205 and S206, a display interface of the second device may remain unchanged, for example, the display interface is the user interface 420 of the conference application shown in (B) in FIG. 4. In S207, the display interface of the second device may be changed to the shared interface. For example, the second option is the screen option 502 of the conference application in the user interface 500 in FIG. 5(B)-1 and FIG. 5(B)-2, and the user interface (that is, the shared interface) corresponding to the second option is the user interface of the conference application on the first device. In this case, the second device may display the shared interface on the user interface 420 of the conference application, as shown in FIG. 13A and FIG. 13B.

S208: The first device sends the media data of the interface corresponding to the second option to the third device.

S209: The third device outputs the media data of the interface corresponding to the second option.

S206 and S207 may be understood that the first device shares the user interface corresponding to the second option with the second device, and S208 and S209 may be understood that the first device shares the user interface corresponding to the second option with the third device.

In some embodiments, before S206, the first device may determine to share the shared interface with the third device. Optionally, when determining the shared interface, the first device shares the shared interface with a nearby device by default, for example, the nearest third device. Optionally, after determining the shared interface, the first device may determine, based on the received user operation, to share the shared interface with the third device. A specific example is as follows:

Example 1: After receiving a third operation of selecting the second option, that is, after receiving an operation performed on the screen option 502 of the conference application in the user interface 500 in FIG. 5(B)-1 and FIG. 5(B)-2, the first device may determine that the shared interface is the user interface of the conference application, and further display an interface for selecting a sharing manner and an interface for selecting a shared device, for example, the user interface 1210 and the user interface 1220 shown in FIG. 12. The first device may receive a fourth operation. The fourth operation may include a user operation (for example, a touch operation) performed on the third option 1214 in the user interface 1210 and a user operation (for example, a touch operation) performed on the option 1222 of the third device in the user interface 1220. The first device may determine, in response to the fourth operation, to share the shared interface with the third device, and determine that a sharing manner is not synchronizing (mirroring) a display interface with the first device. S208 and S209 may be performed.

Example 2: When displaying the user interface 500 shown in FIG. 14(A), the first device may receive a fifth operation. The fifth operation may include a user operation (for example, a touch operation) performed on the lock option 502A of the user interface 500 and a user operation (for example, a touch operation) performed on the screen option 502 of the conference application in the user interface 500. The first device may determine, in response to the fifth operation, that the shared interface is the user interface of the conference application, and determine that the sharing manner is not synchronizing (mirroring) a display interface with the first device. Then, the first device may display a selection interface of the shared device, for example, the user interface 1400 shown in FIG. 14(B). The first device may receive a user operation (for example, a touch operation) performed on the option 1402 of the third device in the user interface 1400, and in response to the user operation, determine to share the shared interface with the third device. S208 and S209 may be performed.

It may be understood that, in the foregoing case, a sequence of S206 and S207, and S208 and S209 is not limited.

In some other embodiments, after sharing the shared interface with the second device, the first device may determine to share the shared interface with the third device. Optionally, after S207, the method may further include: when the first device determines that a preset trigger condition is met (for example, in a case of receiving a new message, such as receiving a new SMS message, receiving a new incoming call, or receiving a notification message of an application, or in a case of switching a display interface, such as entering a recent tasks screen or returning to a home screen), the first device shares the user interface corresponding to the second option with the third device. That is, S208 and S209 are performed.

In some embodiments, in S208, a display interface of the third device may remain unchanged, for example, the user interface 620 of the video application shown in FIG. 6. In S209, the display interface of the third device may be changed to the shared interface, for example, the user interface 1300 shown in FIG. 13A and FIG. 13B is displayed.

S210: The first device outputs media data of an interface other than the interface corresponding to the second option.

Specifically, after the first device shares the interface corresponding to the second option with the second device that has established the first connection and the third device that has established the second connection, the first device may display the user interface other than the interface corresponding to the second option. For example, in the embodiment shown in FIG. 13A and FIG. 13B, the first device displays the user interface 1000 of Messages, the second device displays the shared interface on the user interface 410 of the conference application, that is, the user interface of the conference application on the first device, and the third device displays the shared interface, that is, the user interface 1300 of the conference application on the first device.

In some embodiments, when sharing the interface corresponding to the second option with the second device that has established the first connection, the first device may keep a display interface unchanged, for example, the shared interface. When determining that the preset trigger condition is met, the first device may receive a user operation of switching a display interface, switch the display interface to another interface in response to the user operation, and share the shared interface with the third device that has established the second connection. For example, in S206 and S207, the first device keeps displaying the user interface 410 of the conference application shown in (A) in FIG. 4. After S207 (for example, in S208 to S210), the first device displays the user interface 100 of Messages shown in FIG. 13A and FIG. 13B in response to the user operation of switching the display interface.

In some other embodiments, after the first device shares the shared interface with the second device and the third device, the first device may receive a user operation of switching a display interface, and switch the display interface to another interface in response to the user operation. For example, in S206 to S209, the first device keeps displaying the user interface 410 of the conference application shown in (A) in FIG. 4. After S209 (for example, in S210), the first device displays the user interface 100 of Messages shown in FIG. 13A and FIG. 13B in response to the user operation of switching the display interface.

For an example of implementing the procedure shown in FIG. 16, refer to the embodiments shown in FIG. 4, FIG. 5(A) to FIG. 5(B)-2, and FIG. 12 to FIG. 14(B).

In the method shown in FIG. 16, the first device may share the user interface with the second device that has established the first connection, and a nearby device that is discoverable, connectable, or connected, for example, the third device that has established the second connection. In addition, the first device may display a user interface other than the shared interface. In this way, use of the first device is not affected during screen sharing, so that use is more convenient.

Figure 17:
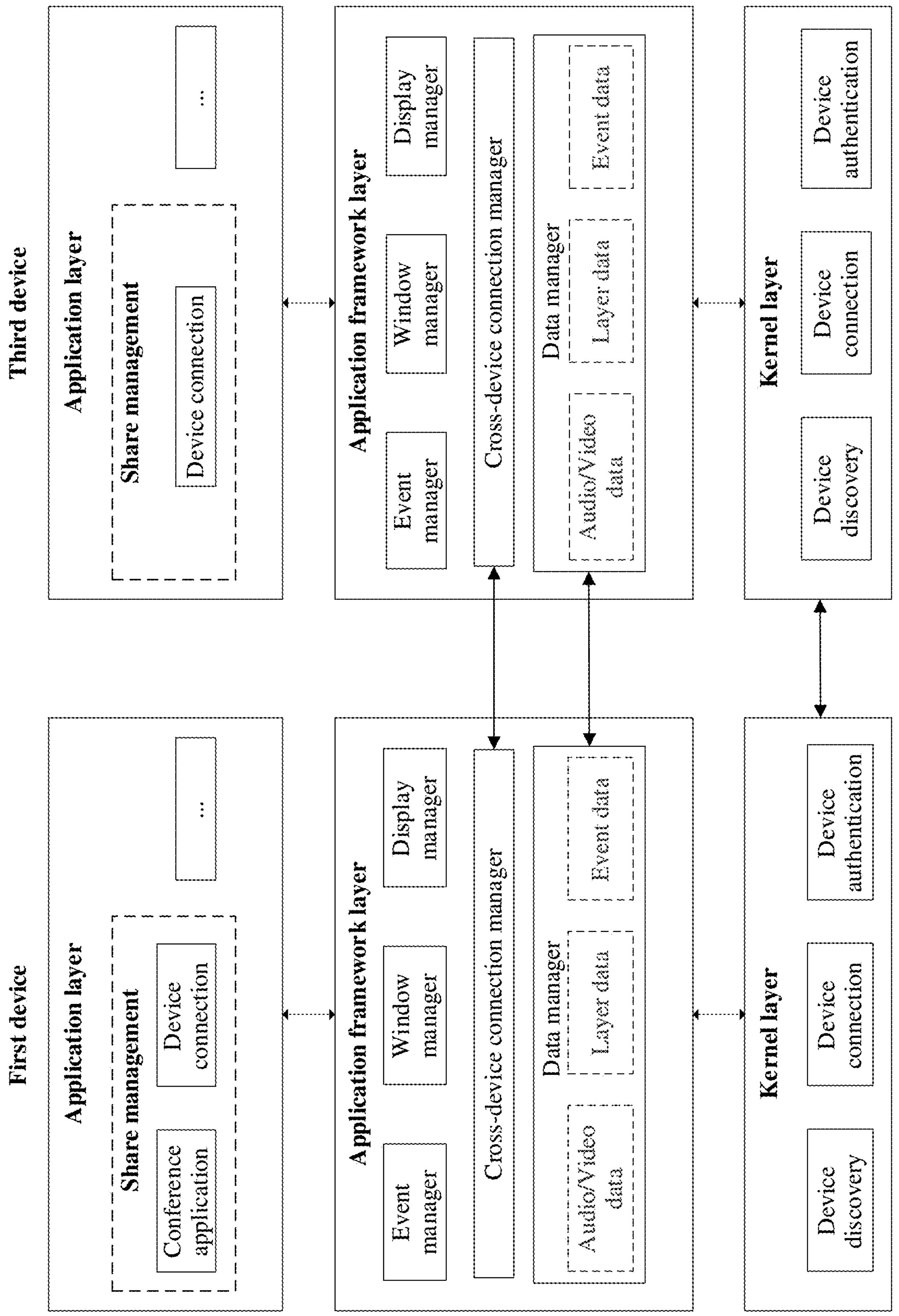
FIG. 17 is a schematic diagram of another software architecture of an electronic device according to an embodiment of this application.

In some embodiments, software architectures of the first device and the third device each may alternatively be an architecture shown in FIG. 17.

FIG. 17 is an example of a schematic diagram of another software architecture of an electronic device.

As shown in FIG. 17, the software architecture of the electronic device may include an application layer, an application framework layer, and a kernel layer.

The application layer may include a plurality of applications, for example, applications related to sharing management: a conference application and device connection. For example, application layers of a first device and a second device (not shown) each may include a conference application, and the first device and the second device may join a same conference by using the conference application, and perform communication through the conference. For example, application layers of the first device and a third device each may include device connection. The device connection may be used to manage related services such as connection establishment, connection status, and connection cancellation of the first device and the third device. The device connection is, for example, a projection application or Tap to Transfer.

The application framework layer may be configured to provide a service for an application at the application layer, for example, an event manager, a window manager, a display manager, a cross-device connection manager, and a data manager.

The event manager may be used to provide services such as receiving and distributing an event, for example, receiving an event reported by a sensor and distributing the event to a corresponding window. For example, in the embodiments shown in FIG. 8, FIG. 9A and FIG. 9B, and FIG. 11, when a main display of the first device is a user interface of Browser shared by the third device, a touch sensor of the first device may receive a touch operation performed on a display, and send a reverse control event corresponding to the touch operation to the event manager, and subsequently may send the reverse control event to the third device.

The window manager may be used to provide a window display service, for example, a window display manner, a display size, a display coordinate position, and a display level. For example, in the embodiment shown in FIG. 5(A) to FIG. 5(B)-2, the conference application of the first device may obtain task information (for example, an application name and a window snapshot) of the first device from the window manager, to display, on the user interface 500, options of shareable screens that are on the first device, that is, the screen option 502 of the conference application and the screen option 503 of Messages. For example, in the embodiment shown in FIG. 6, after obtaining task information of the third device from the cross-device connection manager based on an identifier of the third device, the window manager of the first device may display, on the user interface 610, options of shareable screen that are on the third device, that is, the screen option 612 of the video application and the screen option 613 of Browser.

The display manager may be used to provide a service for managing a main display and a virtual display, for example, a service for creating, destroying, direction switching (for example, landscape/portrait switching), and status changing such as size changing. For example, in the embodiment shown in FIG. 9A and FIG. 9B, after obtaining a size of a main display of the first device, the display manager of the third device may set a size of a virtual display used to display a shared interface to the size of the main display of the first device.

The cross-device connection manager is used to manage connections and communication between devices. For example, the first device and the third device may separately implement connection, authentication, and authorization by using the cross-device connection manager. For example, in the embodiment shown in FIG. 5(A) to FIG. 5(B)-2, the cross-device connection manager of the first device may obtain device information of a nearby device, to provide the device information for the conference application, so as to display, in the user interface 500, an option of the nearby device of the first device, that is, the option 504 of the third device and the option 505 of the fourth device. For example, in the embodiment shown in FIG. 6, the cross-device connection manager of the third device may obtain the task information of the third device from the window manager, and then send the task information to the cross-device connection manager of the first device.

Data manager may be used to provide a service for managing data, for example, managing audio/video data, layer data, and event data. For example, the data manager of the third device may send media data such as layer data and audio/video data to the data manager of the first device, so as to implement screen sharing. For example, the data manager of the first device may obtain event data for the shared interface from the event manager, and then send the event data to the data manager of the third device, so that the third device completes a corresponding event procedure.

The kernel layer may also be referred to as a driver layer, and may provide management services such as device discovery, device authentication, device connection, and device leaving state.

A person of ordinary skill in the art may understand that all or some of the procedures of the methods in the foregoing embodiments may be implemented by a computer program instructing related hardware. The computer program may be stored in a computer-readable storage medium. When the computer program is executed, the procedures in the foregoing method embodiments are performed. The foregoing storage medium includes: any medium that can store computer program code, such as a read-only memory (read-only memory, ROM), a random access memory (random access memory, RAM), a magnetic disk, or an optical disc.

What is claimed is:

1. A method, applied to a first system, wherein the first system comprises a first device, a second device, and a third device, the first device communicates with the second device through a first connection, the first device communicates with the third device through a second connection, the second device and the third device are not connected, the first connection is a different type of connection from the second connection, and the method comprises:

receiving, by the first device, a second operation in a first interface of a conference application, wherein the first device and the second device are in a same conference using the conference application; and displaying, by the first device, a plurality of screen sharing options in a second interface of the conference application in response to receiving the second operation, wherein the plurality of screen sharing options indicates a first option corresponding to sharing a shareable user interface on the third device and a second option corresponding to sharing a shareable user interface on the first device, wherein the third device is not part of the conference with the first device and the second device, and the third device is located within a preset distance of the first device, and wherein screen sharing between the first device and the second device is performed using a server associated with the conference application, and screen sharing between the first device and the third device is performed other than using the server associated with the conference application;

receiving, by the first device, a first operation performed on the plurality of screen sharing options, wherein the first operation triggers sharing of a first shareable interface;

displaying, by the second device, the first shareable interface, and displaying, by the third device, the first shareable interface; and displaying, by the first device, a second shareable interface using a full screen of the first device, wherein the first shareable interface and the second shareable interface are interfaces of different applications, and the first device does not display any content of the first shareable interface while the second shareable interface is displayed using the full screen of the first device.

2. The method according to claim 1, wherein the first operation is performed on the first option, and the method further comprises:

sending, by the first device, first indication information to the third device in response to the first operation, wherein the first indication information indicates the first shareable interface; and sending, by the third device, media data of the first shareable interface to the first device based on the first indication information when displaying a third shareable interface; and wherein displaying, by the third device, the first shareable interface comprises: switching, by the third device, from displaying the third shareable interface to the first shareable interface in response to second indication information sent by the first device or a received third operation.

3. The method according to claim 1, wherein the first operation is performed on the first option, and the method further comprises:

displaying, by the first device, the first shareable interface in response to the first operation; and wherein displaying, by the first device, the second shareable interface comprises: switching, by the first device, from displaying the first shareable interface to the second shareable interface in response to a received fourth operation.

4. The method according to claim 3, further comprising:

receiving, by the first device, a fifth operation when displaying the first shareable interface;

sending, by the first device, information about the fifth operation to the third device;

updating, by the third device, the first shareable interface to a fourth shareable interface based on the information about the fifth operation;

sending, by the third device, media data of the fourth shareable interface to the first device;

displaying, by the first device, the fourth shareable interface based on the media data of the fourth shareable interface, and sending the media data of the fourth shareable interface to the second device; and displaying, by the second device, the fourth shareable interface based on the media data of the fourth shareable interface.

5. The method according to claim 1, wherein the first operation is performed on the second option, the first operation triggers sharing of the first shareable interface with the second device and the third device, and before displaying, by the first device, the second shareable interface, the method further comprises:

displaying, by the first device, the first shareable interface;

switching, by the first device, from displaying the first shareable interface to the second shareable interface in response to a received sixth operation; and displaying, by the first device, first prompt information in response to the received sixth operation, wherein the first prompt information prompts a user whether to switch a display interface of the third device to the second shareable interface.

6. The method according to claim 1, wherein the first operation is performed on the second option, and the first operation triggers sharing of the first shareable interface with the second device;

wherein after displaying, by the second device, the first shareable interface, the method further comprises:

displaying, by the first device, second prompt information in response to a received seventh operation, wherein the second prompt information prompts a user whether to share the first shareable interface with the third device; and sending, by the first device, media data of the first interface to the third device in response to a received eighth operation; and wherein displaying, by the third device, the first shareable interface comprises:

displaying, by the third device, the first shareable interface based on the media data that is of the first shareable interface and that is sent by the first device.

7. The method according to claim 1, wherein the first operation is performed on the second option, and the method further comprises:

receiving, by the third device, a ninth operation when displaying the first shareable interface;

sending, by the third device, information about the ninth operation to the first device;

updating, by the first device, the first shareable interface to a fifth shareable interface based on the information about the ninth operation;

sending, by the first device, media data of the fifth shareable interface to the second device and the third device; and displaying, by the second device, the fifth shareable interface based on the media data of the fifth shareable interface, and displaying, by the third device, the fifth shareable interface based on the media data of the fifth shareable interface.

8. The method according to claim 1, wherein the plurality of screen sharing options indicates a third option corresponding to sharing a shareable user interface on a fourth device, and wherein the fourth device is not part of the conference with the first device and the second device, and the fourth device is located within the preset distance of the first device.

9. A method, applied to a first device, wherein the first device communicates with a second device through a first connection, the first device communicates with a third device through a second connection, the second device and the third device are not connected, the first connection is a different type of connection from the second connection, and the method comprises:

receiving a second operation in a first interface of a conference application, wherein the first device and the second device are in a same conference using the conference application; and displaying a plurality of screen sharing options in a second interface of the conference application in response to receiving the second operation, wherein the plurality of screen sharing options indicates a first option corresponding to sharing a shareable user interface on the third device and a second option corresponding to sharing a shareable user interface on the first device, wherein the third device is not part of the conference with the first device and the second device, and the third device is located within a preset distance of the first device, and wherein screen sharing between the first device and the second device is performed using a server associated with the conference application, and screen sharing between the first device and the third device is performed other than using the server associated with the conference application;

receiving, by the first device, a first operation performed on the plurality of screen sharing options, wherein the first operation triggers sharing of a first shareable interface;

obtaining, in response to receiving the first operation, media data of the first shareable interface that is shareable on the third device;

sending the media data of the first shareable interface to the second device, wherein the media data of the first shareable interface is used by the second device to display the first shareable interface; and displaying a second shareable interface using a full screen of the first device, wherein the first shareable interface and the second shareable interface are interfaces of different applications, and the first device does not display any content of the first shareable interface while the second shareable interface is displayed using the full screen of the first device.

10. The method according to claim 9, wherein obtaining, in response to the first operation, the media data of the first shareable interface that is shareable on the third device comprises:

sending first indication information to the third device in response to receiving the first operation, wherein the first indication information indicates the first shareable interface; and receiving the media data that is of the first shareable interface and that is sent by the third device based on the first indication information, wherein the media data of the first shareable interface is sent by the third device when the third device displays a third shareable interface; and wherein the method further comprises:

sending second indication information to the third device, wherein the second indication information indicates to the third device to switch a display interface from the third shareable interface to the first shareable interface.

11. The method according to claim 9, further comprising:

displaying the first shareable interface in response to the first operation; and wherein displaying the second shareable interface comprises:

switching a display interface from the first shareable interface to the second shareable interface in response to a received fourth operation.

12. The method according to claim 11, further comprising:

receiving a fifth operation when displaying the first shareable interface;

sending information about the fifth operation to the third device;

receiving media data that is of a fourth shareable interface and that is sent by the third device, wherein the fourth shareable interface is obtained by the third device by updating the first shareable interface based on the information about the fifth operation; and displaying the fourth shareable interface based on the media data of the fourth shareable interface, and sending the media data of the fourth shareable interface to the second device, wherein the media data of the fourth shareable interface is used by the second device to display the fourth shareable interface.

13. The method according to claim 9, wherein displaying the second shareable interface comprises:

simultaneously displaying the first shareable interface and the second shareable interface in a split-screen manner or a floating window manner.

14. The method according to claim 9, wherein the plurality of screen sharing options indicates a third option corresponding to sharing a shareable user interface on a fourth device, and wherein the fourth device is not part of the conference with the first device and the second device, and the fourth device is located within the preset distance of the first device.

15. A method, applied to a first device, wherein the first device communicates with a second device through a first connection, the first device communicates with a third device through a second connection, the second device and the third device are not connected, the first connection is a different type of connection from the second connection, and the method comprises:

receiving a second operation in a first interface of a conference application, wherein the first device and the second device are in a same conference using the conference application;

displaying a plurality of screen sharing options in a second interface of the conference application in response to receiving the second operation, wherein the plurality of screen sharing options indicates a first option corresponding to sharing a shareable user interface on the third device and a second option corresponding to sharing a shareable user interface on the first device, wherein the third device is not part of the conference with the first device and the second device, and the third device is located within a preset distance of the first device, and wherein screen sharing between the first device and the second device is performed using a server associated with the conference application, and screen sharing between the first device and the third device is performed other than using the server associated with the conference application;

receiving, by the first device, a first operation performed on the plurality of screen sharing options, wherein the first operation triggers sharing of a first shareable interface;

in response to receiving the first operation, sending media data of the first shareable interface that is shareable on the first device to the second device, wherein the media data of the first shareable interface is used by the second device to display the first interface;

sending the media data of the first shareable interface to the third device, wherein the media data of the first shareable interface is used by the third device to display the first shareable interface; and displaying a second shareable interface using a full screen of the first device, wherein the first shareable interface and the second shareable interface are interfaces of different applications, and the first device does not display any content of the first shareable interface while the second shareable interface is displayed using the full screen of the first device.

16. The method according to claim 15, wherein before displaying the second shareable interface, the method further comprises:

displaying the first shareable interface;

switching a display interface from the first shareable interface to the second shareable interface in response to a received sixth operation; and displaying first prompt information in response to the received sixth operation, wherein the first prompt information prompts a user whether to switch a display interface of the third device to the second shareable interface.

17. The method according to claim 15, wherein before sending the media data of the first shareable interface to the third device, the method further comprises:

displaying second prompt information in response to a received seventh operation, wherein the second prompt information prompts a user whether to share the first shareable interface with the third device; and wherein sending the media data of the first shareable interface to the third device comprises:

sending the media data of the first shareable interface to the third device in response to a received eighth operation.

18. The method according to claim 15, further comprising:

receiving information about a ninth operation that is sent by the third device, wherein the ninth operation is an operation received by the third device when the third device displays the first shareable interface;

updating the first shareable interface to a fifth shareable interface based on the information about the ninth operation; and sending media data of the fifth shareable interface to the second device and the third device, wherein the media data of the fifth shareable interface is used by the second device and the third device to display the fifth shareable interface.

19. The method according to claim 15, wherein the plurality of screen sharing options indicates a third option corresponding to sharing a shareable user interface on a fourth device, and wherein the fourth device is not part of the conference with the first device and the second device, and the fourth device is located within the preset distance of the first device.

20. The method according to claim 15, wherein the first shareable interface is a browser application interface and the second shareable interface is a message application interface.

* * * * *